(12) United States Patent
Oh et al.

(10) Patent No.: US 12,675,719 B2
(45) Date of Patent: Jul. 7, 2026

(54) QUANTUM COMPUTING SYSTEM AND METHOD FOR OPERATING THE SAME

(71) Applicant: Electronics and Telecommunications Research Institute, Daejeon (KR)

(72) Inventors: Soo Cheol Oh, Daejeon (KR); Chei Yol Kim, Daejeon (KR); Jin Ho On, Daejeon (KR); Sang Min Lee, Daejeon (KR); Gyu Il Cha, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 940 days.

(21) Appl. No.: 17/900,239

(22) Filed: Aug. 31, 2022

(65) Prior Publication Data

US 2023/0129967 A1 Apr. 27, 2023

(30) Foreign Application Priority Data

Oct. 26, 2021 (KR) ......................... 10-2021-0143604
May 13, 2022 (KR) ......................... 10-2022-0058786

(51) Int. Cl.
*G06N 10/20* (2022.01)
*G06N 10/80* (2022.01)

(52) U.S. Cl.
CPC ............. *G06N 10/20* (2022.01); *G06N 10/80* (2022.01)

(58) Field of Classification Search
CPC ................................ G06N 10/20; G06N 10/80
See application file for complete search history.

(56) References Cited

U.S. PATENT DOCUMENTS

| | | | | |
|---|---|---|---|---|
| 7,876,145 B2 * | 1/2011 | Koch | ...................... | B82Y 10/00 |
| | | | | 327/527 |
| 11,694,108 B2 * | 7/2023 | Tezak | ...................... | G06N 20/10 |
| | | | | 703/14 |
| 12,321,838 B2 * | 6/2025 | McClean | ............... | G06N 20/10 |
| 2019/0244128 A1 * | 8/2019 | Choi | ...................... | G06N 10/20 |
| 2020/0125985 A1 * | 4/2020 | Narang | ................. | G06N 10/60 |
| 2020/0311593 A1 * | 10/2020 | Gidney | ................. | H04B 10/70 |

(Continued)

FOREIGN PATENT DOCUMENTS

| | | |
|---|---|---|
| KR | 10-2168677 | 10/2020 |
| WO | 2020/056176 | 3/2020 |

OTHER PUBLICATIONS

Lao et al., Applicant Provided Art on IDS Jun. 12, 2025 NPL Ref. #1 (Published May 28, 2018) (Year: 2018).*

(Continued)

*Primary Examiner* — Lewis A Bullock, Jr.
*Assistant Examiner* — Theodore E Hebert
(74) *Attorney, Agent, or Firm* — KILE PARK REED & HOUTTEMAN PLLC

(57) ABSTRACT

A quantum computing system according to an embodiment of the present disclosure includes a logical qubit quantum compiler configured to receive a specific quantum code and to output a quantum kernel based on a quantum basic operation command, a logical qubit quantum kernel executor configured to generate a plurality of physical qubit quantum commands based on the quantum kernel, and a physical qubit quantum system configured to receive the physical qubit quantum command and to perform a physical quantum operation.

17 Claims, 35 Drawing Sheets

(56) References Cited

U.S. PATENT DOCUMENTS

| | | | | |
|---|---|---|---|---|
| 2020/0313879 A1* | 10/2020 | Hong | .................... | H04L 9/0852 |
| 2021/0117843 A1* | 4/2021 | Delfosse | ................ | G06N 10/20 |
| 2021/0125096 A1* | 4/2021 | Puri | ....................... | G06N 10/40 |
| 2021/0334081 A1* | 10/2021 | Chong | ................. | G06F 9/4881 |
| 2022/0150044 A1* | 5/2022 | Xiang | .................... | H04L 7/033 |

OTHER PUBLICATIONS

Rana, Negative eigenvalues of partial transposition of arbitrary bipartite states, American Physical Society (Published May 2, 2013) retrieved from https://journals.aps.org/pra/abstract/10.1103/PhysRevA.87.054301 on Sep. 29, 2025 (Year: 2013).*

Lao L, et al., "Mapping of Lattice Surgery-based Quantum Circuits on Surface Code Architectures", arXiv:1805.11127v1, Delft University of Technology, The Netherlands, May 28, 2018.

Daniel Herr, et al., "Lattice Surgery Translation for Quantum Computation", arXiv:1608.05208v2, Quantum Condensed Matter Research Group, Aug. 29, 2016.

Lao et al., "Mapping of lattice surgery-based quantum circuits on surface code architectures", Quantum Science and Technology, Sep. 12, 2018, pp. 1-20.

Lao et al. "Mapping of Lattice Surgery-based Quantum Circuits on Surface Code Architectures", Quantum Sci. Technol. 4, 015005, May 28, 2018, https://arxiv.org/abs/1805.11127.

* cited by examiner

LOGICAL QUBIT HAVING TOP/BOTTOM
PART AS X BOUNDARY AND RIGHT/LEFT
PART AS Z BOUNDARY

LOGICAL QUBIT HAVING RIGHT/LEFT
PART AS X BOUNDARY AND
TOP/BOTTOM PART AS Z BOUNDARY

LOGICAL QUBIT HAVING LEFT/RIGHT
AND RIGHT/TOP PART AS X BOUNDARY
AND LEFT/TOP AND RIGHT/BOTTOM
PART AS Z BOUNDARY

130

LOGICAL QUBIT HAVING LEFT/TOP
AND RIGHT/BOTTOM PART AS
X BOUNDARY AND LEFT/BOTTOM AND
RIGHT/TOP PART AS Z BOUNDARY

Figure 2:
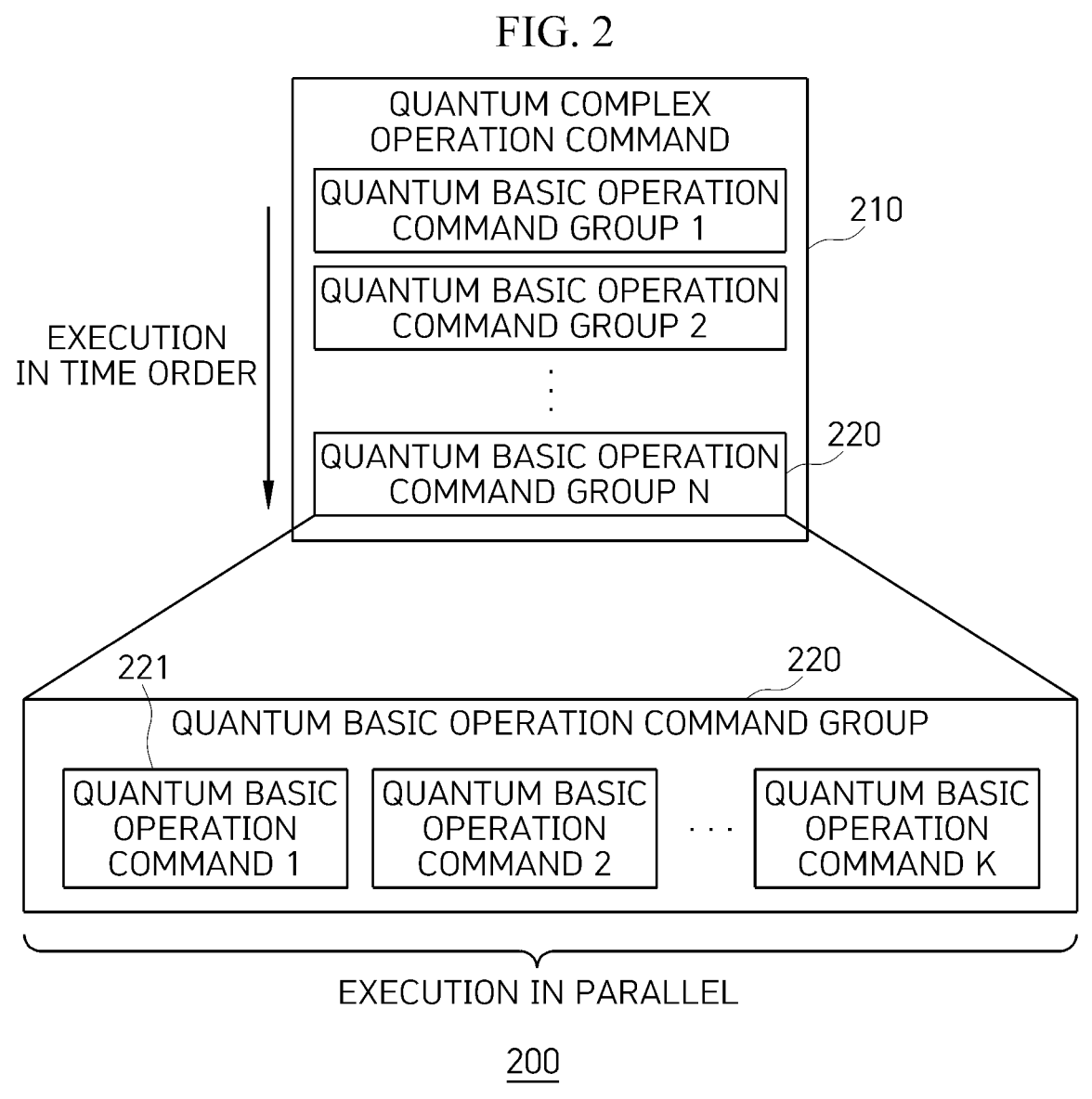

QUANTUM COMPLEX
OPERATION COMMAND

QUANTUM BASIC OPERATION
COMMAND GROUP 1

QUANTUM BASIC OPERATION
COMMAND GROUP 2

⋮

QUANTUM BASIC OPERATION
COMMAND GROUP N

210

220

EXECUTION
IN TIME ORDER

QUANTUM BASIC OPERATION COMMAND GROUP

221

220

| QUANTUM BASIC OPERATION COMMAND 1 | QUANTUM BASIC OPERATION COMMAND 2 | · · · | QUANTUM BASIC OPERATION COMMAND K |

EXECUTION IN PARALLEL

200

910

920

1010

1020

MLQ
(m_n)

LOGICAL QUBIT
(ENTANGLEMENT STATE)

1110

LQ
(m)

LQ
(n)

1120

1210

1220

1310

1320

1410

1420

1510

1520

1610

1620

1630

1640

1650

1710

1720

1730

1740

1750

1810

INITIALIZATION[|0>]

INITIALIZATION[|0>]

1820

1830

1840

1850

1860

1870

1880

1890

1910

1920

1930

1940

1950

1960

1970

2010

2020

2030

2040

2050

2060

2070

QUANTUM COMPUTING SYSTEM AND METHOD FOR OPERATING THE SAME

CROSS-REFERENCE TO RELATED APPLICATION

This application claims priority to and the benefit of Korean Patent Application No. 10-2021-0143604, filed on Oct. 26, 2021, and Korean Patent Application No. 10-2022-0058786, filed on May 13, 2022, the disclosure of which is incorporated herein by reference in its entirety.

BACKGROUND

1. Technical Field

The present disclosure relates to a quantum computing system and a method for operating the same, and particularly, to a quantum computing system based on a dedicated quantum operation command structure using a logical qubit, and a method for operating the same.

2. Related Art

A quantum computer is a computer that processes data by using a quantum mechanical phenomenon, such as entanglement and superposition. The quantum computer is considered a next-generation computer that can replace a semiconductor computer. However, technology researches related to the quantum computer have not yet reached implementation of the quantum computer.

The quantum computer has been actively researched by various enterprises. The recent quantum computer is at the early development stage having the level of supporting quantum bits (qubits) having about 50 information errors, and has not yet been commercialized.

Meanwhile, a quantum computing system has a high error rate of a physical qubit. Thus, and in order to reduce the error rate, the quantum computing system uses a method for generating and operates one logical qubit by using a plurality of physical qubits. However, in order to effectively implement the quantum computing system, a quantum operation command structure for the logical qubit is necessary, but until now, the quantum operation command structure having been used for the physical qubits is used as it is without any correction.

In general, the logical qubit is composed of a plurality of physical qubit sets, and for a quantum logical operation command that is aimed at the logical qubit, a much more complicated performing process is used as compared with the process for a physical qubit quantum operation command.

Accordingly, there is a need for a dedicated quantum operation command structure based on a logical qubit that accurately reflects the operation characteristic of the logical qubit, and through this, time and a resource size required to perform the logical qubit quantum operation command can be reduced.

SUMMARY

In order to solve the above problem, the present disclosure proposes an operation decomposition based quantum basic operation command using a logical qubit of a surface code type and a quantum complex operation command combined with this, and provides a method for operating corresponding commands and a quantum computing system therefor.

However, problems to be solved by the present disclosure are not limited to the above-described problems, and other problems may exist.

In a first aspect of the present disclosure to solve the above problem, a quantum computing system includes: a logical qubit quantum compiler configured to receive a specific quantum code and to output a quantum kernel based on a quantum basic operation command; a logical qubit quantum kernel executor configured to generate a plurality of physical qubit quantum commands based on the quantum kernel; and a physical qubit quantum system configured to receive the physical qubit quantum command and to perform a physical quantum operation.

In a second aspect of the present disclosure, an operation method performed by a quantum computing system includes: receiving a specific quantum code and outputting a quantum kernel based on a quantum basic operation command; generating a plurality of physical qubit quantum commands based on the output quantum kernel; and receiving the physical qubit quantum command and performing a physical quantum operation.

In another aspect of the present disclosure to solve the above problem, a computer program executes an operation method performed by a quantum computing system in combination with a hardware computer, and is stored in a computer-readable recording medium.

Other detailed matters of the present disclosure are included in the detailed description and drawings.

According to an embodiment of the present disclosure described above, a logical qubit dedicated quantum operation command structure for a logical qubit quantum computing system is proposed. The logical qubit quantum operation command structure according to an embodiment of the present disclosure can decompose the existing quantum command into smaller operation units and express up to a intermediate logical qubit additionally required to perform a logical qubit quantum operation command.

Accordingly, an embodiment of the present disclosure can reduce computational resources and execution costs taken for work scheduling and optimization that are performed before an actual quantum command is performed.

Effects of the present disclosure are not limited to those described above, and other unmentioned effects will be able to be clearly understood by those of ordinary skill in the art from the following description.

BRIEF DESCRIPTION OF THE DRAWINGS

FIGS. 1A to 1D are diagrams illustrating examples of logical qubit dispositions.

FIG. 2 is a diagram explaining a method for configuring a quantum complex operation command according to an embodiment of the present disclosure.

FIGS. 18A to 18l are diagrams explaining an operation method for a SWAP quantum complex operation command according to an embodiment of the present disclosure.

DETAILED DESCRIPTION

Figure 1A:
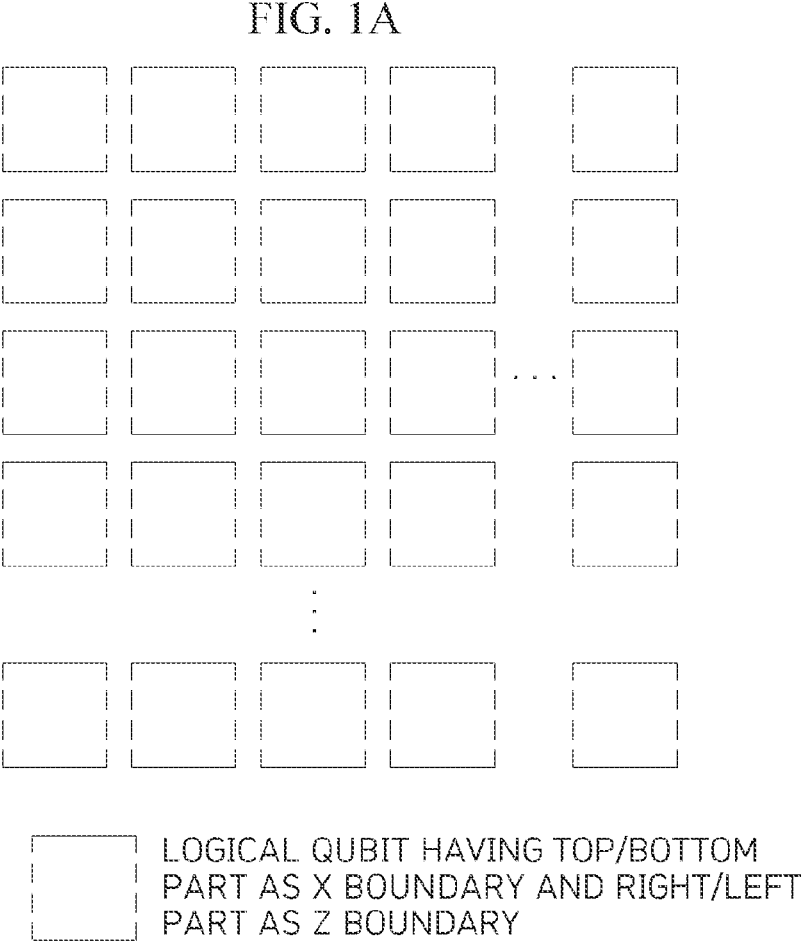

The aspects and features of the present disclosure and methods for achieving the aspects and features will be apparent by referring to embodiments to be described in detail with reference to the accompanying drawings. However, the present disclosure is not limited to the embodiments disclosed hereinafter, and it can be implemented in various different forms. However, the embodiments are provided to complete the present disclosure and to assist those of ordinary skill in the art in a comprehensive understanding of the scope of the technical idea, and the present disclosure is only defined by the scope of the appended claims.

Terms used in the description are to explain the embodiments, but are not intended to limit the present disclosure. In the description, unless specially described on the contrary, the constituent element(s) may be singular or plural. In the description, the term "comprises" and/or "comprising" should not be interpreted as excluding the presence or addition of one or more other constituent elements in addition to the mentioned constituent elements. Throughout the whole description, the same reference numerals are used to indicate the same constituent elements, and the term "and/or" includes each of the mentioned constituent elements and all combinations of one or more thereof. The terms "first", "second", and so forth are used to describe various constituent elements, but these constituent elements should not be limited by the terms. The above-described terms are used only for the purpose of discriminating one constituent element from another constituent element. Accordingly, the first constituent element to be mentioned hereinafter may be the second constituent element within the technical idea of the present disclosure.

Unless otherwise defined, all terms (including technical and scientific terms) used in the description may be used as the meaning that can be commonly understood by those skilled in the art to which the present disclosure pertains. Further, unless clearly and specially defined, the terms defined in generally used dictionaries should not be interpreted ideally or excessively.

Hereinafter, to help understanding of those skilled in the art, backgrounds in which the present disclosure is proposed will be first described, and then, the present disclosure will be described in detail.

A quantum computer is a futuristic super computer based on quantum mechanics, such as entanglement and superposition. With the prospect that the quantum computer will be commercialized within 10 years, the quantum computer has been spotlighted as a future technology to solve problems that mankind has not yet solved, such as the development of new materials or new drug, and aerospace.

Such a quantum computer has been researched by various enterprises. IBM was the first company that introduced quantum computing to a public cloud so that a user was able to remotely access the quantum computer, and in 2018, Google proclaimed to the scientific community that they had achieved quantum supremacy by using a 54-qubit quantum processor called Sycamore.

Basically, a quantum computing system is very vulnerable to an error, and in order to enhance reliability of the system, a quantum error correction code technology is generally used. Recently, among quantum error correction code technologies in relation to this, a surface code has the highest feasibility as the system.

The surface code is a method for providing one logical qubit by using a plurality of physical qubits. A lattice surgical technique is representatively used to implement a quantum operation that is aimed at a plurality of logical qubits on the surface code.

The existing quantum operation command structure is based on the physical qubit, and applies the physical qubit even to the logical qubit technology as it is. Therefore, it is unable to properly reflect the characteristics of a new logical qubit quantum operation. For example, the existing quantum operation command structure is unable to express a intermediate logical qubit that is additionally used for a plurality of logical qubit quantum operations. Further, the existing quantum operation command structure has the disadvantage that quantum execution codes obtained by decomposing the logical qubit quantum operation into physical qubit quantum operations have large sizes.

This causes high optimization time and resource usage load to occur in performing the optimization of the logical qubit operation and efficient work scheduling.

In order to solve the above problem, a quantum computing system and a method for operating the same according to an embodiment of the present disclosure propose an operation decomposition based quantum basic operation command using a surface code type logical qubit and a quantum complex operation command combined with this.

A dedicated quantum operation command structure for the logical qubit is made by splitting the logical quantum operation command into the quantum basic operation commands which correspond to an operation unit that is smaller than the operation unit of the basic physical command. Through this, an embodiment of the present disclosure can reduce the resource usage load and the optimization time required for work scheduling and optimization that are performed before the quantum operation command for the actual logical qubit is performed. In relation to this, more detailed explanation thereof is as follows.

First, an embodiment of the present disclosure processes the quantum operation work scheduling related to the intermediate logical qubit at the quantum compiling time before the operation execution, rather than the time when the actual quantum operation is performed.

The logical qubit quantum operation requires the intermediate logical qubit that is additionally used for the operation in addition to a data logical qubit for storing data. However, the existing physical qubit type quantum operation structure is unable to express the intermediate logical qubit. Accordingly, since the selection of the intermediate logical qubit and the parallel/sequential execution scheduling are performed at the time when the actual quantum operation is executed, an additional execution load is caused, and there is more likely to exceed a coherence time of the physical qubit.

The quantum operation command structure proposed in an embodiment of the present disclosure enables the intermediate logical qubit to be expressed. Accordingly, the selection of the intermediate logical qubit and the parallel/sequential execution scheduling are enabled to be performed at the quantum compiling time rather than the time when the actual quantum operation is performed. Accordingly, an embodiment of the present disclosure can reduce the additional execution time load when the actual quantum operation is performed.

Second, an embodiment of the present disclosure can reduce the time taken for the optimization work after the logical qubit quantum operation is decomposed into the physical qubit quantum operations.

A single logical qubit is specified as a distance d, and as the d increases, the error rate becomes reduced. The number of physical qubits constituting the single logical qubit becomes $d^2$, and the number of physical quantum operations constituting the logical quantum operation is increased to 0 $(d^2)$. In order to reduce the error rate, the d should be increased, and the single logical quantum operation is actually decomposed into several hundreds to tens of thousands of physical quantum operations. In order to finally perform the decomposed physical quantum operations by the physical qubit quantum operation system, the optimization work should be performed through reflection of the characteristics of the physical quantum system. Further, the optimization work for large-scaled physical quantum operations in one problem space requires a lot of computational resources and execution costs.

In this case, a quantum operation optimization problem space is expressed by the number of physical qubits decomposed from the logical qubit operation and a command depth. The command depth denotes the number of quantum operations that are sequentially performed based on the single physical qubit.

An embodiment of the present disclosure can reduce the number of physical qubits used for optimization and an operation depth by decomposing a single logical quantum command into quantum basic operation commands that are smaller operation units. Accordingly, an embodiment of the present disclosure can reduce the size of a problem space required for the optimization work. As a result, an embodiment of the present disclosure can reduce the size of a computational resource and a processing time necessary for the optimization work of a physical quantum operation.

Hereinafter, a quantum computing system according to an embodiment of the present disclosure will be described in detail with reference to FIGS. 1A to 20G.

FIGS. 1A to 1D are diagrams illustrating examples of logical qubit dispositions.

FIGS. 1A to 1D illustrate four representative examples of various disposition structures of a logical qubit (LQ) based on a surface code. In each drawing, a small square represents one logical qubit generated by applying a surface code to a plurality of physical qubits.

Each logical qubit has two kinds of boundaries. In this case, a solid line represents an X boundary, and a dotted line represents a Z boundary. In the description of the present disclosure, the X boundary is referred to as a first boundary, and the Z boundary is referred to as a second boundary. However, the boundaries are not limited thereto, and depending on an embodiment, the X boundary may be the second boundary, and in contrast, the Z boundary may be the first boundary. The logical qubits may neighbor to face each other through the same boundary (through the first boundary or through the second boundary), and various logical qubit dispositions that satisfy such a condition are possible.

FIG. 1A shows a structure 110 in which logical qubits, each having a top/bottom part as the first boundary (X boundary) and a left/right part as the second boundary (Z boundary), are disposed in horizontal and vertical directions.

Figure 1B:
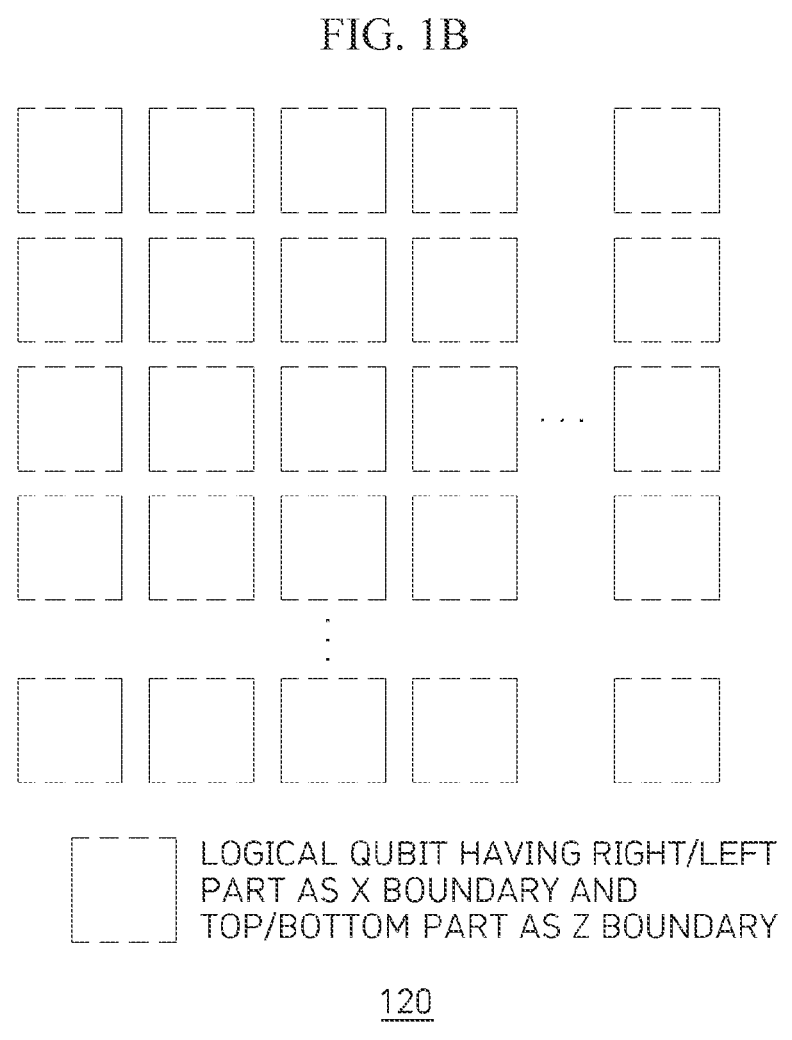

FIG. 1B shows a structure 120 in which logical qubits, each having a left/right part as the first boundary (X boundary) and a top/bottom part as the second boundary (Z boundary), are disposed in horizontal and vertical directions.

Figure 1C:
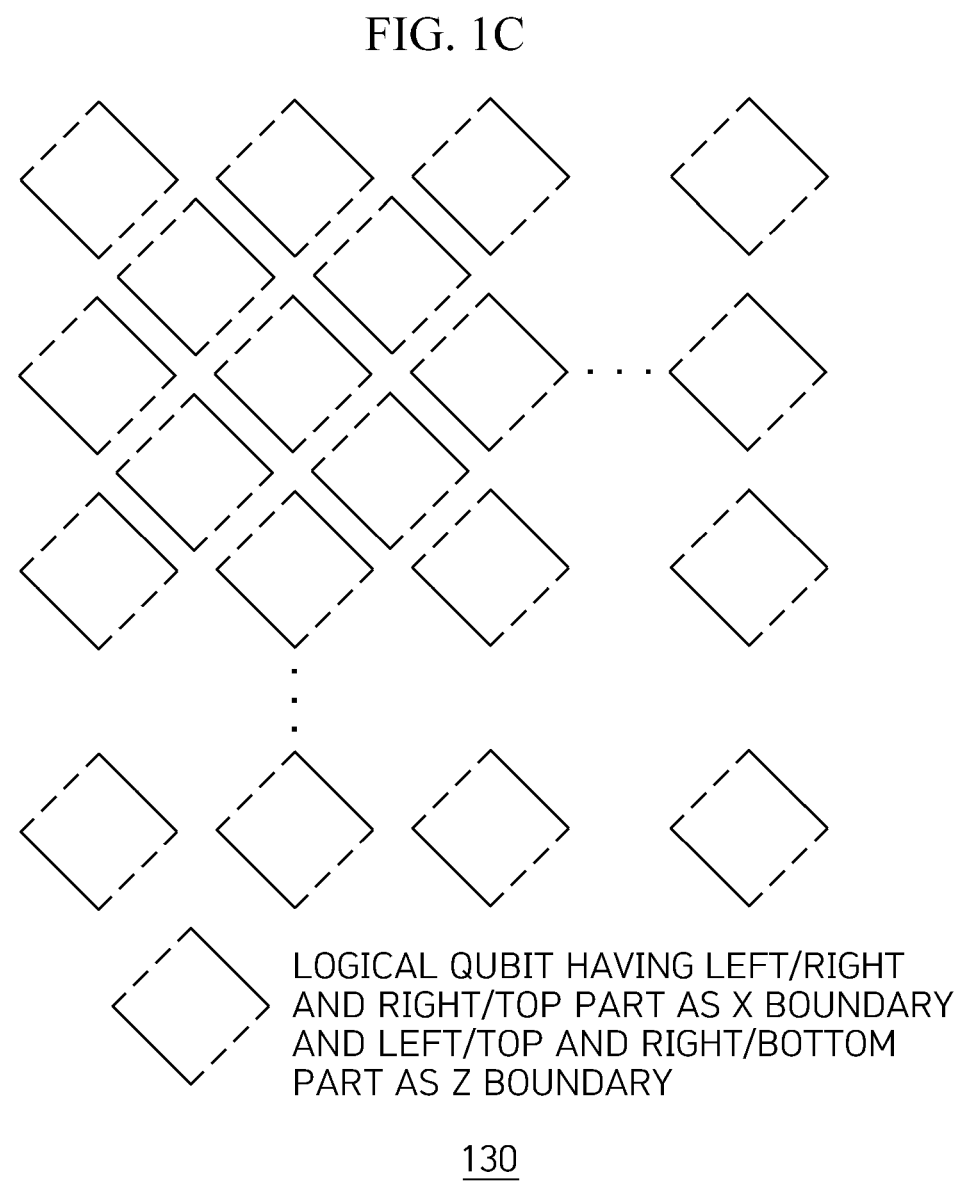
Figure 1D:
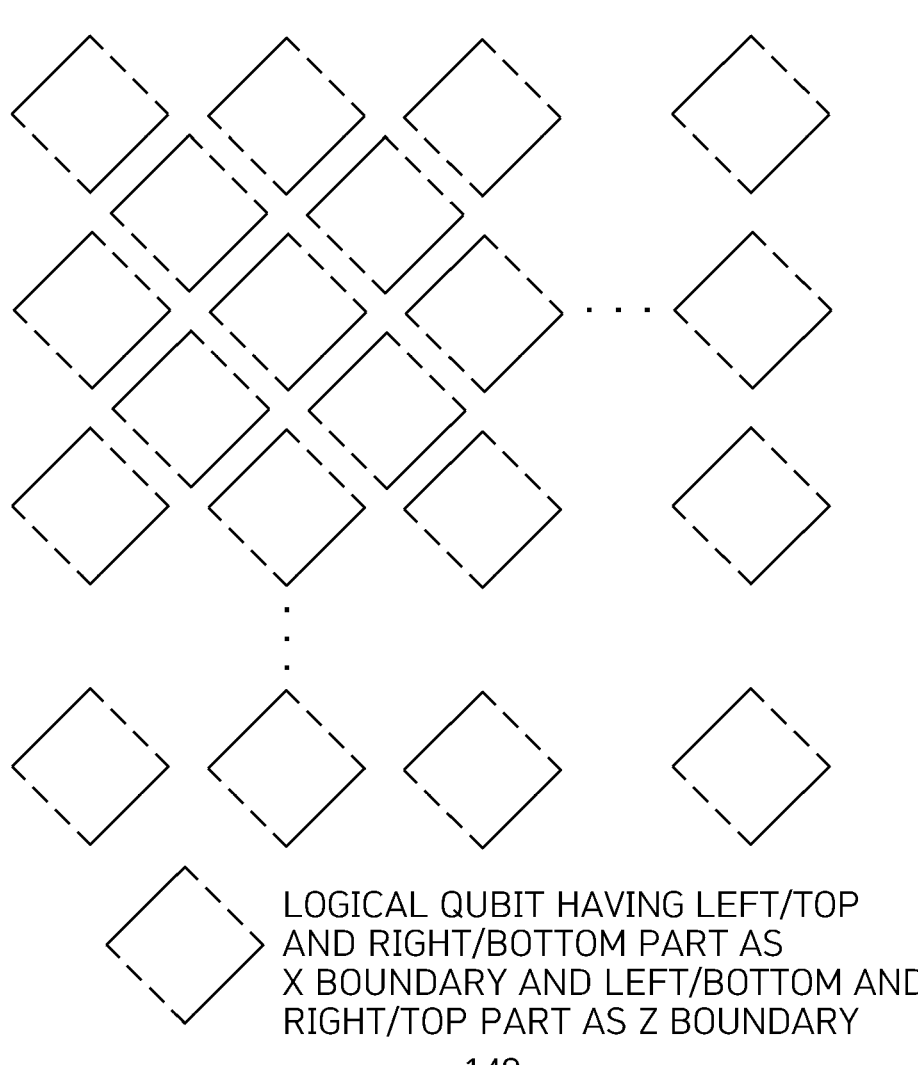

FIGS. 1C and 1D show a structure in which logical qubits are disposed in a diagonal direction. FIG. 1C shows a structure 130 in which logical qubits, each having top/right and bottom/left parts as the first boundary (X boundary) and top/left and bottom/right parts as the second boundary (Z boundary), are disposed in a diagonal direction. FIG. 1D shows a structure 140 in which logical qubits, each having top/left and bottom/right parts as the first boundary (X boundary) and top/right and bottom/left parts as the second boundary (Z boundary), are disposed in a diagonal direction.

Hereinafter, for convenience in explanation, the present disclosure will be described based on the disposition structure 110 illustrated in FIG. 1A. However, the scope of the present disclosure is not limited thereto, and the same command and operation can be used even in the disposition structure illustrated in the drawing and in other applicable disposition structures.

In a quantum computing system for logical qubits based on a surface code according to an embodiment of the present disclosure, a lattice surgery technique is used to perform a quantum operation with respect to a plurality of logical qubits. In order to use the lattice surgery technique in various logical qubit dispositions explained with reference to FIGS. 1A to 1D, the present disclosure proposes a quantum basic operation command and a quantum complex operation command as follows. In this case, the quantum complex operation command is generated as a combination of quantum basic operation commands.

First, the quantum basic operation command proposed in an embodiment of the present disclosure is as follows.

MERGE_MXX a, b: logical qubit (a) and logical qubit (b) neighboring on a second boundary (Z boundary) are merged into one logical qubit.

MERGE_MZZ a, b: logical qubit (a) and logical qubit (b) neighboring on a first boundary (X boundary) are merged into one logical qubit.

SPLIT_MXX a, b: The logical qubit merged by using a MERGE_MXX quantum basic operation command is re-split into logical qubit (a) and logical qubit (b).

SPLIT_MZZ a, b: The logical qubit merged by using a MERGE_MZZ quantum basic operation command is re-split into logical qubit (a) and logical qubit (b).

MOVE_POST_MXX a, b: This is a quantum basic operation command that is used at the last stage of the execution of a MOVE_MXX command that is the quantum complex operation command. The departure of MOVE operation is logical qubit (a), and the destination thereof is logical qubit (b).

MOVE_POST_MZZ a, b: This is a quantum basic operation command that is used at the last stage of the execution of a MOVE_MZZ command that is the quantum complex operation command. The departure of MOVE operation is logical qubit (a), and the destination thereof is logical qubit (b).

CNOT_POST_MXX a, b, c: This is a command that is used at the last stage of the execution of a CNOT_MXX command that is the quantum complex operation command. logical qubit (a) is used as a control, logical qubit (b) is used as a target, and logical qubit (c) is used as a intermediate logical qubit.

CNOT_POST_MZZ a, b, c: This is a command that is used at the last stage of the execution of a CNOT_MZZ command that is the quantum complex operation command. logical qubit (a) is used as a control, logical qubit (b) is used as a target, and logical qubit (c) is used as a intermediate logical qubit.

For reference, in the description of the present disclosure, as needed, MERGE_MXX and MERGE_MZZ are referred to as a merge quantum basic operation commands, SPILT_MXX or SPILT_MZZ is referred to as a split quantum basic operation command, MOVE_POST_MXX or MOVE_POST_MZZ is referred to as a movement post-processing quantum basic operation command, and CNOT_POST_MXX or CNOT_POST_MZZ is referred to as a CNOT post-processing quantum basic operation command.

Next, a quantum complex operation command proposed in an embodiment of the present disclosure is as follows.

MOVE_MXX a, b: The state of logical qubit (a) that is the departure is moved to a destination logical qubit (B) adjacent on the second boundary (Z boundary).

MOVE_MZZ a, b: The state of logical qubit (a) that is the departure is moved to a destination logical qubit (B) adjacent on the first boundary (X boundary).

SWAP a, b, c, d: The states of logical qubit (a) and logical qubit (b) are swapped with each other. In order to perform the swap operation, logical qubit (c) and logical qubit (d) are used as intermediate qubits.

CNOT_MXX a, b, c/CNOT_MZZ a, b, c: A controlled-NOT operation is performed, in which logical qubit (a) is used as the control, and logical qubit (b) is used as the target. In this case, logical qubit (c) is used as a intermediate qubit. CNOT_MXX is a method in which merge of logical qubit (b) used as the target and logical qubit (c) used as the intermediate qubit is first performed, and CNOT_MZZ is a method in which merge of logical qubit (a) used as the control and logical qubit (c) used as the intermediate qubit is first performed. The final performance results of CNOT_MXX and CNOT_MZZ are the same.

For reference, in the description of the present disclosure, as needed, MOVE_MXX or MOVE_MZZ is referred to as a movement quantum complex operation command, SWAP is referred to as a swap quantum complex operation command, and CNOT_MXX or CNOT_MZZ is referred to as a CNOT quantum complex operation command.

FIG. 2 is a diagram explaining a method for configuring a quantum complex operation command according to an embodiment of the present disclosure.

As an embodiment, one quantum complex operation command 210 includes n (n is a natural number) quantum basic operation command groups 220. The quantum basic operation command groups 220 in the quantum complex operation command 210 should be sequentially executed in accordance with time. Accordingly, after completion of execution of quantum basic operation command group 1, quantum basic operation command group 2 should be executed, and quantum basic operation command group n is lastly executed.

As an embodiment, one quantum basic operation command group 220 includes k (k is a natural number) quantum basic operation commands 221. If a plurality of quantum basic operation commands 221 are included in the quantum basic operation command group 220, the quantum basic operation commands 221 are executed in parallel to each other. That is, quantum basic operation commands 1 to k may be simultaneously performed in parallel to each other.

Accordingly, the one quantum complex operation command 210 is finally composed of the plurality of quantum basic operation commands 221 that are performed in parallel or sequentially.

A method for configuring a quantum complex operation command by combining the quantum basic operation commands of FIG. 2 will be described with reference to FIGS. 3 to 7. In this case, an INIT command is a quantum basic operation command for initializing a single logical qubit, and is used to configure the quantum complex operation command although it is not the command proposed in the present disclosure.

For reference, the numbers of logical qubits illustrated in FIGS. 3 to 7 are given to coincide with the explanation of the detailed operations of quantum basic operation commands and quantum complex operation commands in FIGS. 9 to 20 to be described later.

Figure 3:
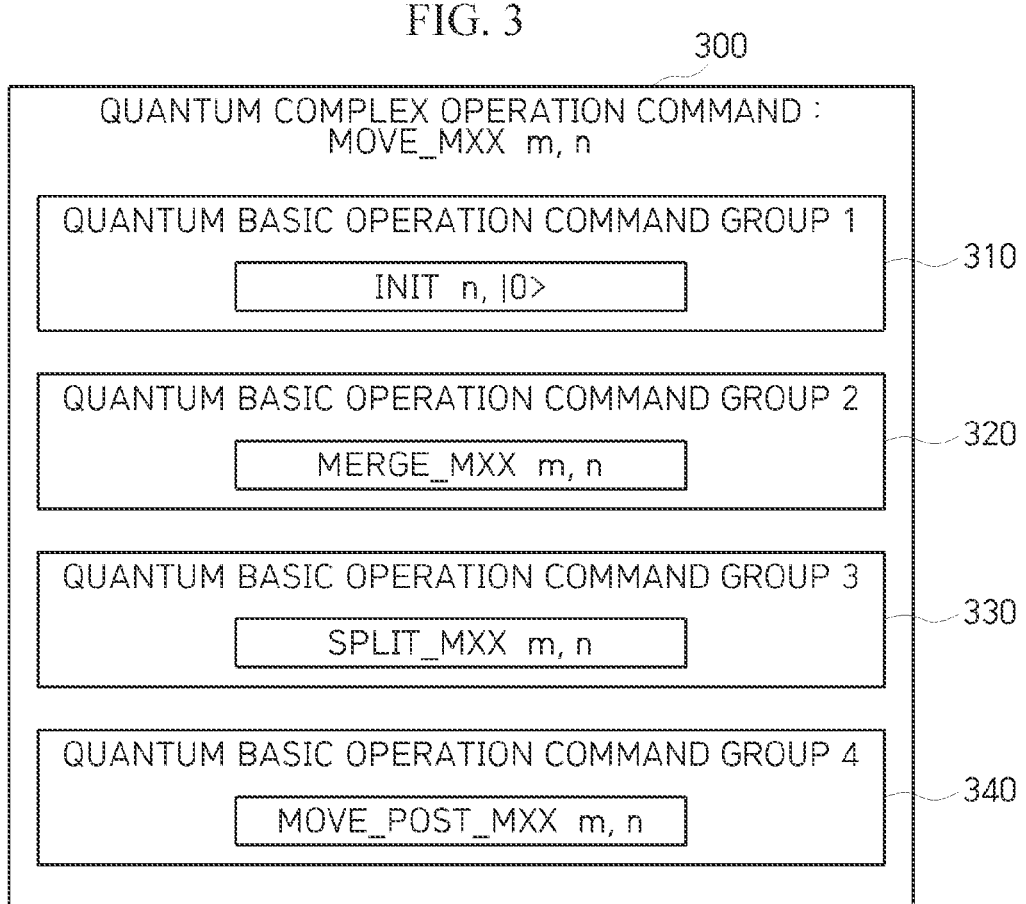
FIG. 3 is a diagram explaining the configuration of a MOVE_MXX quantum complex operation command.

FIG. 3 is a diagram explaining the configuration of a MOVE_MXX quantum complex operation command.

A MOVE_MXX command 300 that is the movement quantum complex operation command is the quantum complex operation command for moving the state of the first logical qubit that is the departure to the second logical qubit that is the destination adjacent to the second boundary (Z boundary).

The MOVE_MXX quantum complex operation command 300 is composed of four quantum basic operation command groups 310, 320, 330, and 340. Each of the quantum basic operation command groups 310, 320, 330, and 340 includes only one quantum basic operation command. Accordingly, the MOVE_MXX quantum complex operation command 300 corresponds to sequential execution of the INIT command, MERGE_MXX command, SPLIT_MXX command, and MOVE_POST_MXX command.

Figure 4:
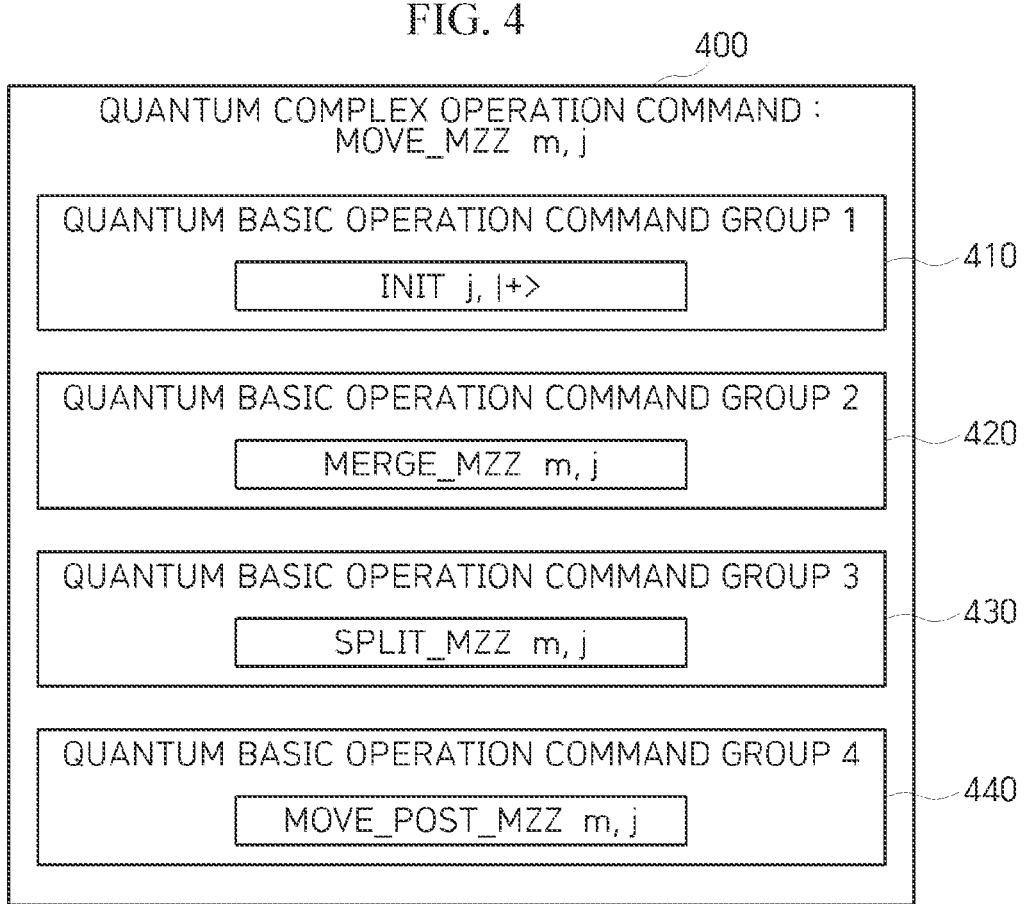
FIG. 4 is a diagram explaining the configuration of a MOVE_MZZ quantum complex operation command.

FIG. 4 is a diagram explaining the configuration of a MOVE_MZZ quantum complex operation command.

A MOVE_MZZ command 400 that is the movement quantum complex operation command is the quantum complex operation command for moving the state of the first logical qubit that is the departure to the second logical qubit that is the destination adjacent to the first boundary (X boundary).

The MOVE_MZZ quantum complex operation command 400 is composed of four quantum basic operation command groups 410, 420, 430, and 440 in the same manner as the MOVE_MXX quantum complex operation command 300. Each of the quantum basic operation command groups 410, 420, 430, and 440 includes only one quantum basic operation command. Accordingly, the MOVE_MZZ quantum complex operation command 400 corresponds to sequential execution of the INIT command, MERGE_MZZ command, SPLIT_MZZ command, and MOVE_POST_MZZ command.

Figure 5:
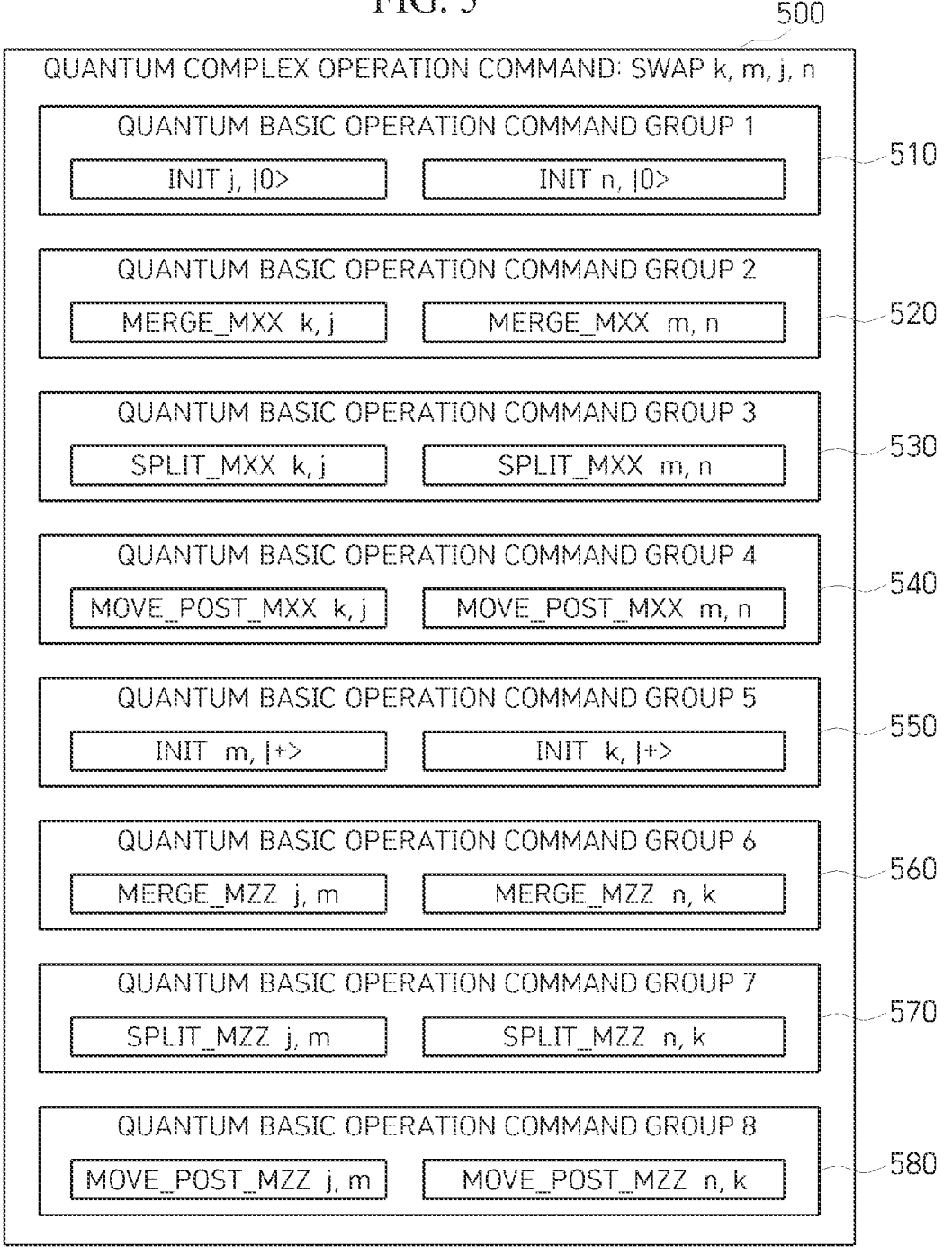
FIG. 5 is a diagram explaining the configuration of a SWAP quantum complex operation command.

FIG. 5 is a diagram explaining the configuration of a SWAP quantum complex operation command.

A SWAP command 500 that is the swap quantum complex operation command is the quantum complex operation command for performing the swap of the states of the first logical qubit and the second logical qubit with each other.

The SWAP quantum complex operation command 500 is composed of 8 quantum basic operation command groups 510, 520, 530, 540, 550, 560, 570, and 580. Each of the quantum basic operation command groups 510, 520, 530, 540, 550, 560, 570, and 580 is composed of two quantum basic operation commands. The two quantum basic operation commands that belong to each of the quantum basic operation command groups 510, 520, 530, 540, 550, 560, 570, and 580 may be performed in parallel to each other.

Further, quantum basic operation command groups 1 to 8 510, 520, 530, 540, 550, 560, 570, and 580 in the SWAP quantum complex operation command 500 should be sequentially executed. First, the two INIT commands belonging to quantum basic operation command group 1 510 are performed in parallel to each other. If performing of the two INIT commands is completed, the two MERGE_MXX commands belonging to quantum basic operation command group 2 520 are then performed in parallel to each other. In such an order, up to quantum basic operation command groups 3 to 8 530, 540, 550, 560, 570, and 580 are performed.

Figure 6:
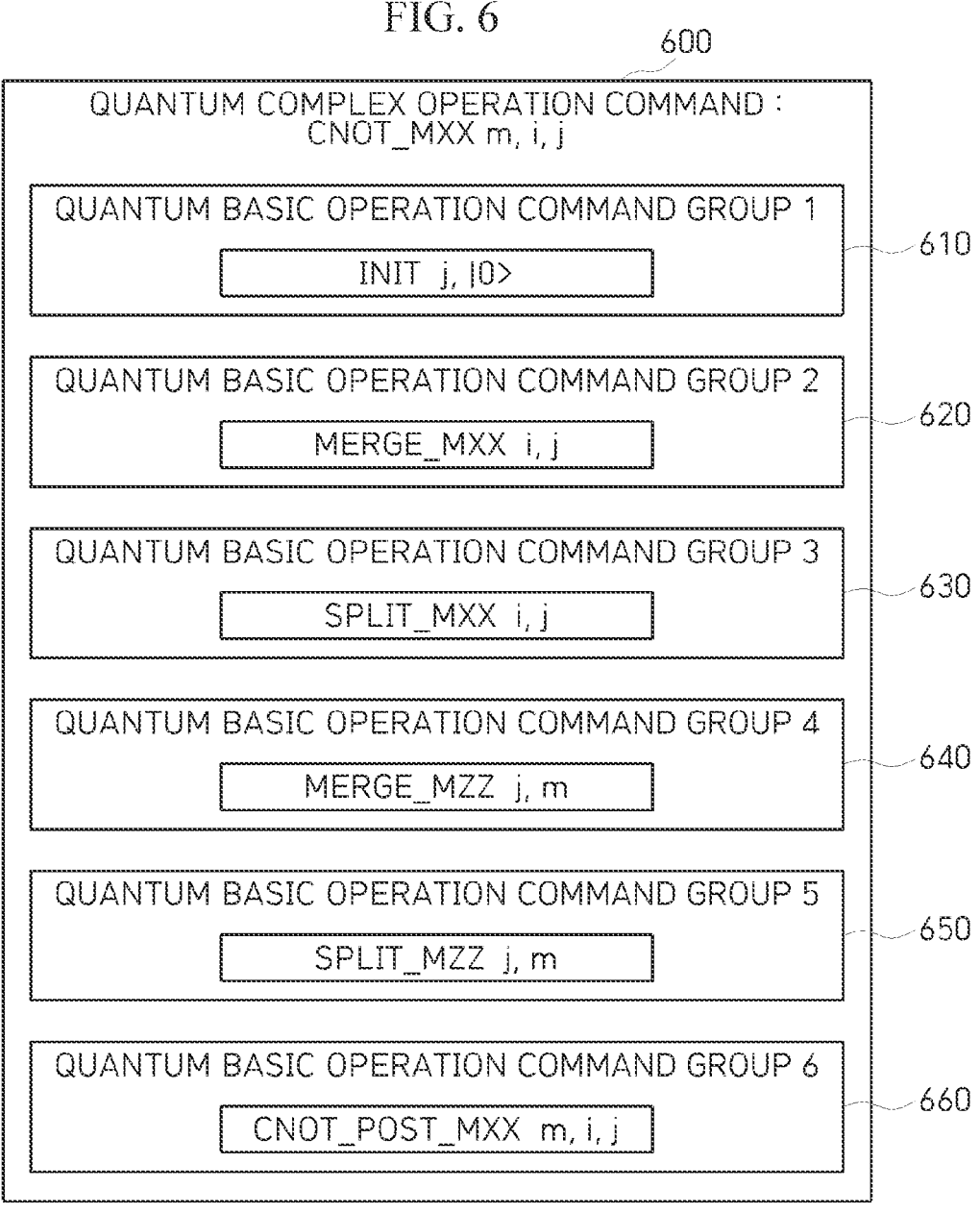
FIG. 6 is a diagram explaining the configuration of a CNOT_MXX quantum complex operation command.

FIG. 6 is a diagram explaining the configuration of a CNOT_MXX quantum complex operation command.

A CNOT quantum complex operation command 600 is the quantum complex operation command for performing the controlled-NOT operation in which any one of the first logical qubit and the second logical qubit is used as the control or the target.

The CNOT_MXX quantum complex operation command 600 is composed of 6 quantum basic operation command groups 610, 620, 630, 640, 650, and 660. Each of the quantum basic operation command groups 610, 620, 630, 640, 650, and 660 includes only one quantum basic operation command. Accordingly, the CNOT_MXX quantum complex operation command 600 corresponds to sequential execution of the INIT command, MERGE_MXX command, SPLIT_MXX command, MERGE_MZZ command, SPLIT_MZZ command, and CNOT_POST_MXX command.

Figure 7:
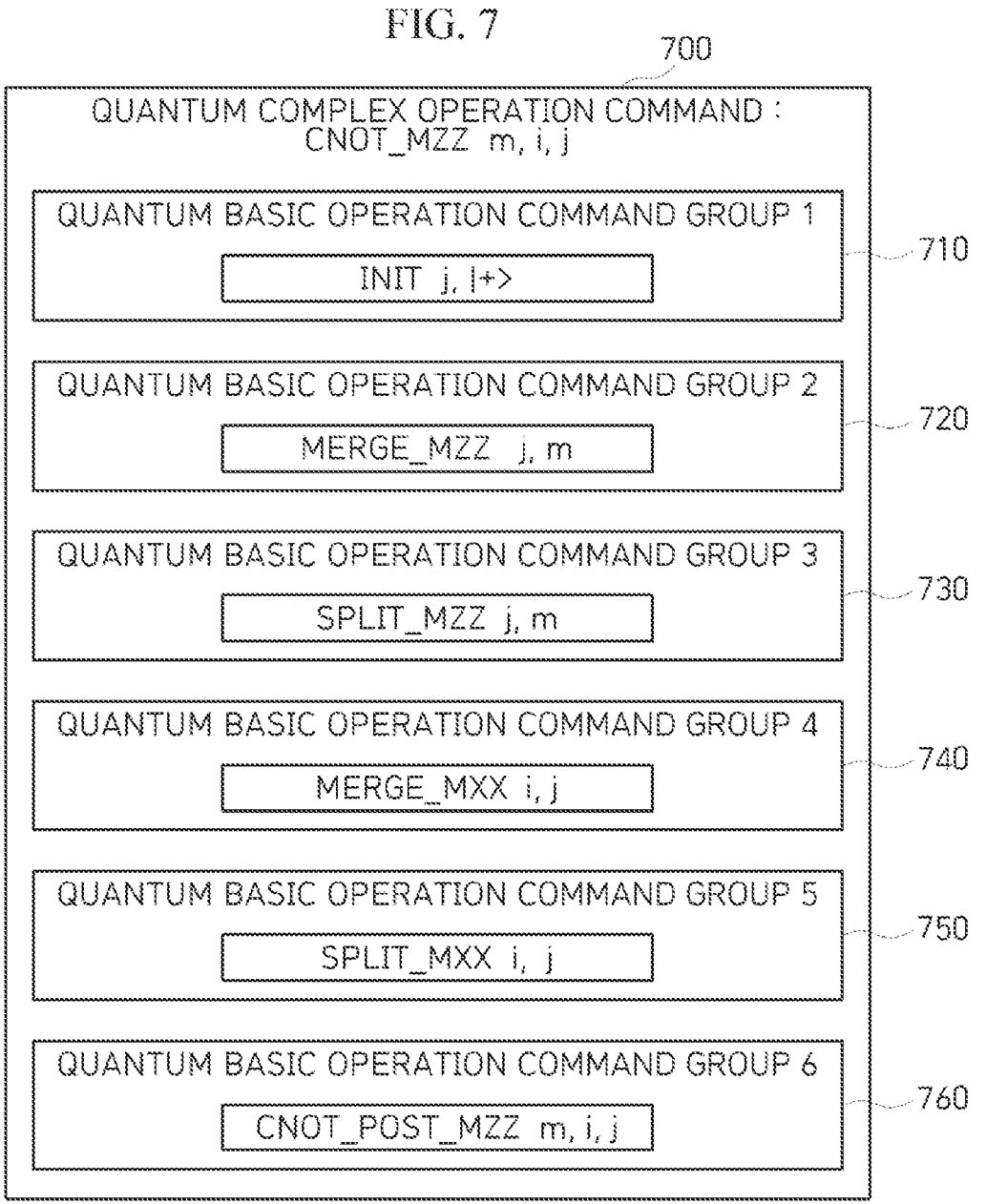
FIG. 7 is a diagram explaining the configuration of a CNOT_MZZ quantum complex operation command.

FIG. 7 is a diagram explaining the configuration of a CNOT_MZZ quantum complex operation command.

A CNOT_MZZ quantum complex operation command 700 is composed of 6 quantum basic operation command groups 710, 720, 730, 740, 750, and 760. Each of the quantum basic operation command groups 710, 720, 730, 740, 750, and 760 includes only one quantum basic operation command. Accordingly, the CNOT_MZZ quantum complex operation command 700 corresponds to sequential execution of the INIT command, MERGE_MZZ command, SPLIT_MZZ command, MERGE_MXX command, SPLIT_MXX command, and CNOT_POST_MZZ command.

Next, a quantum computing system for logical qubits that process the above-described quantum basic operation command and quantum complex operation command will be described with reference to FIG. 8.

Figure 8:
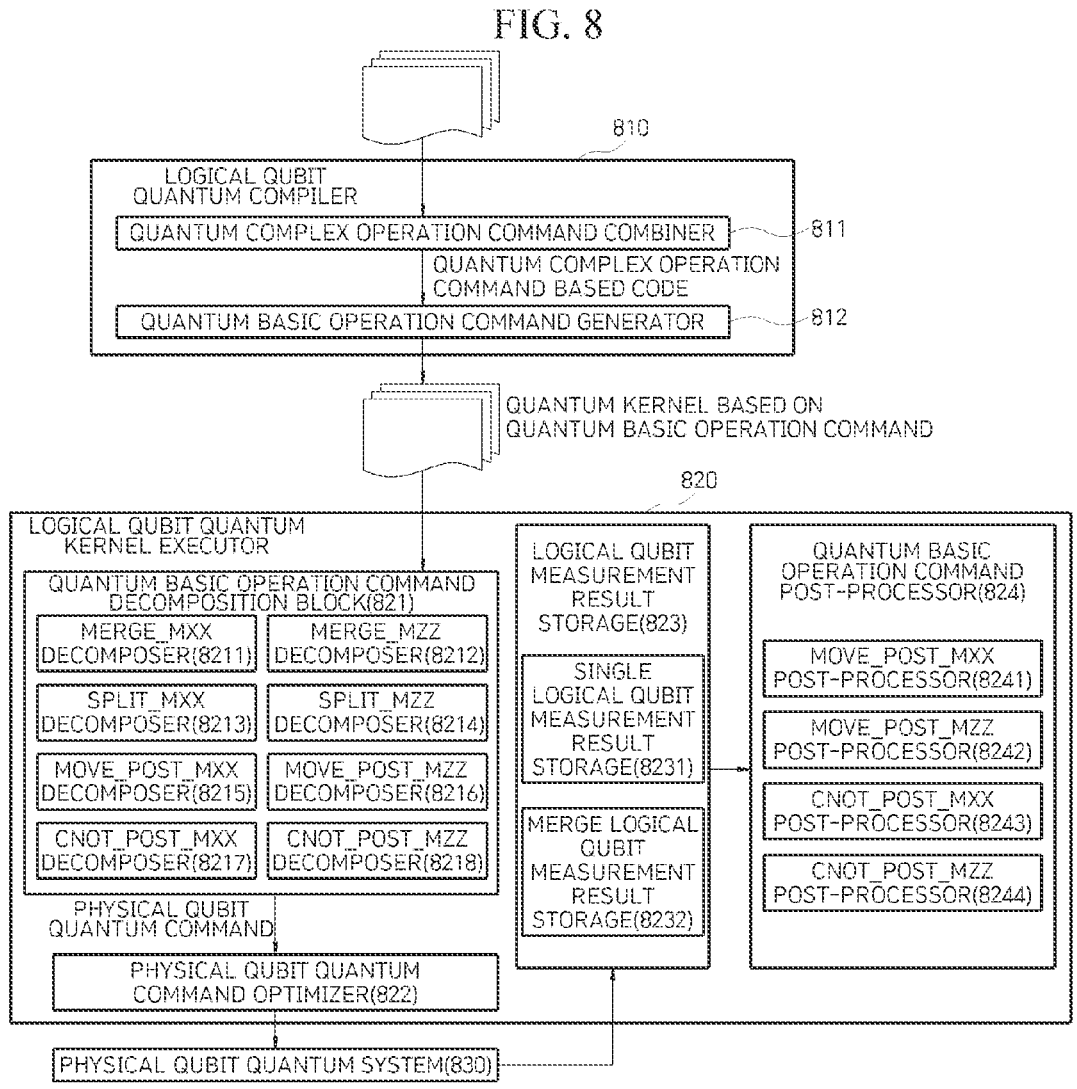
FIG. 8 is a block diagram of a quantum computing system according to an embodiment of the present disclosure.

FIG. 8 is a block diagram of a quantum computing system according to an embodiment of the present disclosure.

A quantum computing system 800 according to an embodiment of the present disclosure includes a logical qubit quantum compiler 810, a logical qubit quantum kernel executor 820, and a physical qubit quantum system 830.

The logical qubit quantum compiler 810 receives a specific quantum code, and outputs a quantum kernel based on the quantum basic operation command. In this case, the specific quantum code may be a quantum code prepared by a user.

As an embodiment, the logical qubit quantum compiler 810 may include a quantum complex operation command combiner 811 and a quantum basic operation command generator 812.

The quantum complex operation command combiner 811 generates a code based on the quantum complex operation command through decomposition of the specific quantum code. Thereafter, the quantum basic operation command generator 812 receives and decomposes the code based on the quantum complex operation command into quantum basic operation commands, and generates a quantum kernel based on the quantum basic operation commands.

Accordingly, the quantum kernel generated by the logical qubit quantum compiler 810 as its output is composed of the combinations of quantum basic operation commands, and the quantum kernel is input to the logical qubit quantum kernel executor 820.

The logical qubit quantum kernel executor 820 generates a plurality of physical qubit quantum commands based on the input quantum kernel.

As an embodiment, the logical qubit quantum kernel executor 820 may include a quantum basic operation command decomposition block 821, a physical qubit quantum command optimizer 822, a logical qubit measurement result storage 823, and a quantum basic operation command postprocessor 824.

Since one logical qubit is composed of a plurality of physical qubits, one quantum basic operation command should be decomposed into a plurality of physical qubit quantum commands. The quantum basic operation command decomposition block 821 performs such a decomposition work. That is, the quantum basic operation command decomposition block 821 receives the quantum kernel, and decomposes the quantum basic operation command into a plurality of physical qubit quantum commands.

The quantum basic operation command decomposition block 821 according to an embodiment of the present disclosure may include a MERGE_MXX decomposer 8211, a MERGE_MZZ decomposer 8212, a SPLIT_MXX decomposer 8213, a SPLIT_MZZ decomposer 8214, a MOVE_POST_MXX decomposer 8215, a MOVE_POST_MZZ decomposer 8216, a CNOT_POST_MXX decomposer 8217, and a CNOT_POST_MZZ decomposer 8218.

The physical qubit quantum command optimizer 822 performs optimization and scheduling of the decomposed physical qubit quantum command so as to correspond to the characteristic of the physical qubit quantum system 830.

The optimized physical quantum command is transferred to the physical qubit quantum system 830, and the physical quantum operation is performed. If the physical quantum operation in the physical qubit quantum system 830 is ended, the physical qubit measurement result is stored in the logical qubit measurement result storage 823.

The logical qubit measurement result storage 823 may include a single logical qubit measurement result storage 8231 and a merge logical qubit measurement result storage 8232.

The single logical qubit measurement result storage 8231 generates and stores the single logical qubit measurement result through a combination of the physical qubit measurement results, resulting from the physical quantum operation performed.

The merge logical qubit measurement result storage 8232 stores the merge measurement result measured as a result of performing the MERGE_MXX and MERGE_MZZ commands, which are merge quantum basic operation commands.

Meanwhile, execution of the MERGE_MXX command, MERGE_MZZ command, SPILT_MXX command, and SPILT_MZZ command is performed by the physical qubit quantum system 830. Further, the measurement result is stored in the logical qubit measurement result storage 823. However, the MOVE_POST_MXX command, MOVE_POST_MZZ command, CNOT_POST_MXX command, and CNOT_POST_MZZ command should be additionally post-processed by the quantum basic operation command post-processor 824.

The quantum basic operation command post-processor 824 according to an embodiment of the present disclosure may include a MOVE_POST_MXX post-processor 8241, a MOVE_POST_MZZ post-processor 8242, a CNOT_POST_MXX post-processor 8243, and a CNOT_POST_MZZ post-processor 8244.

The MOVE_POST_MXX post-processor 8241 performs all works excluding the destination logical qubit measurement from the MOVE_POST_MXX command to be described later with reference to FIG. 13. The MOVE_POST_MZZ post-processor 8242 performs all works excluding the destination logical qubit measurement from the MOVE_POST_MZZ command to be described later with reference to FIG. 14. The CNOT_POST_MXX post-processor 8243 performs all works excluding measurement of logical qubit j from the CNOT_POST_MXX command to be described later with reference to FIG. 15. The CNOT_POST_MZZ post-processor 8244 performs all works excluding measurement of logical qubit j from the CNOT_POST_MZZ command to be described later with reference to FIG. 15.

Hereinafter, operation methods of a quantum basic operation command and a quantum complex operation command proposed by the present disclosure will be described in more detail. In the drawings, for explanation of the operation methods, the numbers of the logical qubits are given from i to q.

First, an operation method of a quantum basic operation command in an embodiment of the present disclosure will be described with reference to FIGS. 9A to 15B.

Figure 9A:
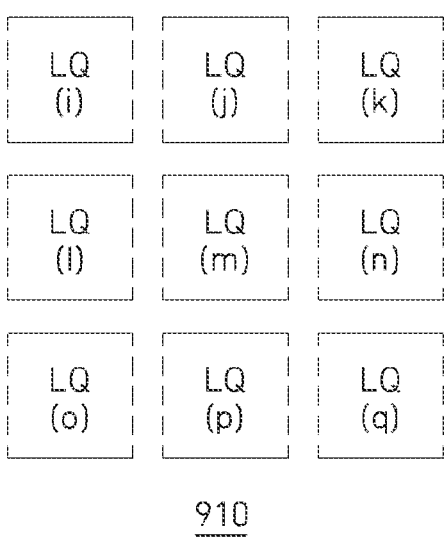
FIGS. 9A and 9B are diagrams explaining an operation method for a MERGE_MXX quantum basic operation command according to an embodiment of the present disclosure.
Figure 9B:
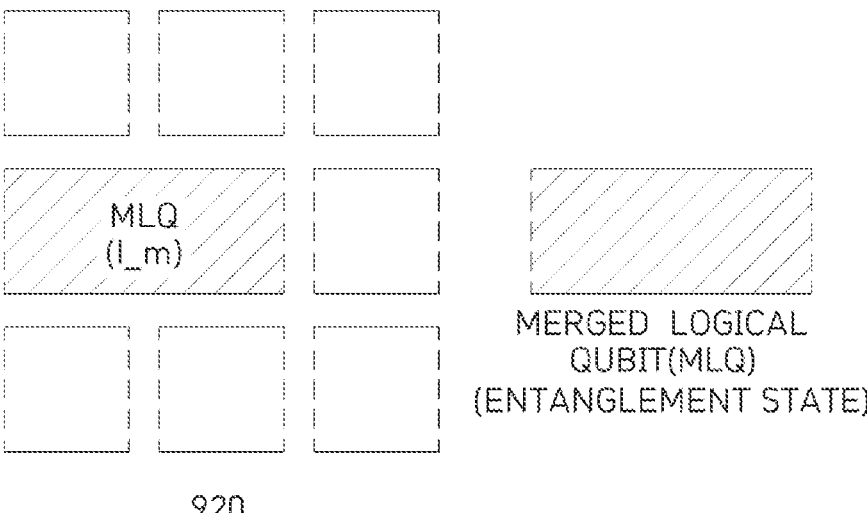

FIGS. 9A and 9B are diagrams explaining an operation method of a MERGE_MXX quantum basic operation command according to an embodiment of the present disclosure.

A MERGE command that is a merge quantum basic operation command among quantum basic operation commands is a quantum basic operation command for merging a first logical qubit and a second logical qubit neighboring on a first boundary (X boundary) or on a second boundary (Z boundary) into one logical qubit. As the merge quantum basic operation command is performed, the merged logical qubit has an entanglement state of the first and second logical qubits.

MERGE_MXX is an operation of merging two logical qubits neighboring on the second boundary (Z boundary) into one logical qubit. First, FIG. 9A illustrates a state 910 before logical qubit (l) and logical qubit (m) are merged. FIG. 9B illustrates a result 920 in which as the MERGE_MXX quantum basic operation command is performed, logical qubit (l) and logical qubit (m) are merged, and one merged logical qubit (MLQ) (l_m) is generated.

In this case, the state of the merged logical qubit (l_m) is defined as entanglement of two logical qubit states before the merge. The merge measurement result after the MERGE_MXX command is performed is stored in the merge logical qubit measurement result storage 823 of the logical qubit quantum kernel executor for other quantum basic operation commands to be performed thereafter.

Figure 10A:
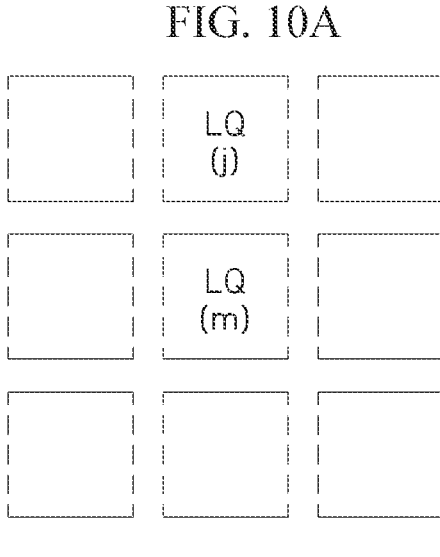
FIGS. 10A and 10B are diagrams explaining an operation method for a MERGE_MZZ quantum basic operation command according to an embodiment of the present disclosure.
Figure 10B:
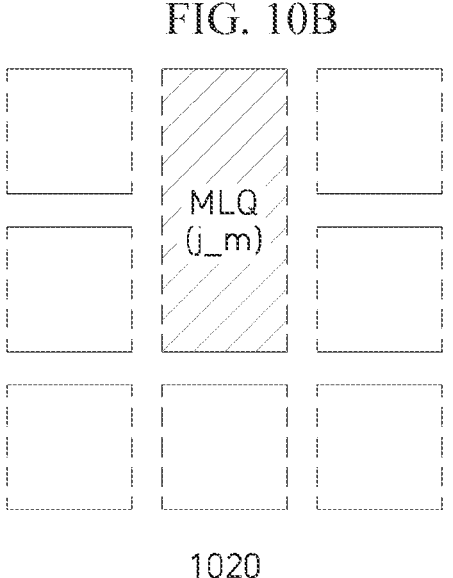

FIGS. 10A and 10B are diagrams explaining an operation method for a MERGE_MZZ quantum basic operation command according to an embodiment of the present disclosure.

The MERGE_MZZ is an operation of merging two logical qubits neighboring on the first boundary (X boundary) into one logical qubit. First, FIG. 10A illustrates a state 1010 before logical qubit (j) and logical qubit (m) are merged. FIG. 10B illustrates the result 1020 in which as the MERGE_MZZ quantum basic operation command is performed, logical qubit (j) and logical qubit (m) are merged, and one merged logical qubit (j_m) is generated.

In this case, the state of the merged logical qubit (j_m) is defined as entanglement of two logical qubit states before the merge. The merge measurement result after the MERGE_MZZ command is performed is stored in the merge logical qubit measurement result storage 823 of the logical qubit quantum kernel executor for other quantum basic operation commands to be performed thereafter.

Figure 11A:
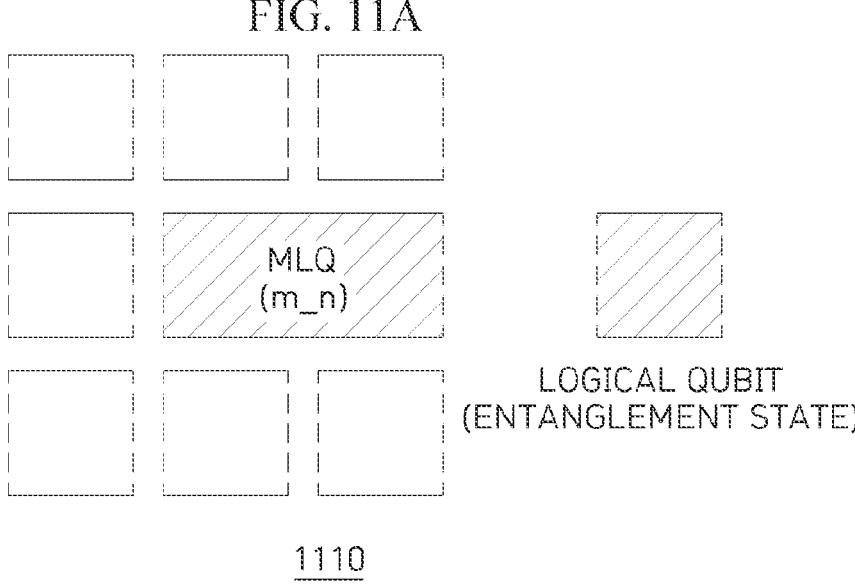
FIGS. 11A and 11B are diagrams explaining an operation method for a SPLIT_MXX quantum basic operation command according to an embodiment of the present disclosure.
Figure 11B:
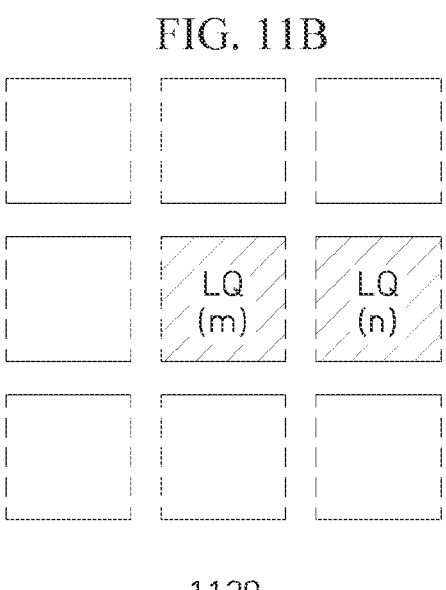

FIGS. 11A and 11B are diagrams explaining an operation method for a SPLIT_MXX quantum basic operation command according to an embodiment of the present disclosure.

A SPLIT command that is a split quantum basic operation command among quantum basic operation commands is a quantum basic operation command for splitting a logical qubit merged according to a MERGE command into a first logical qubit and a second logical qubit neighboring on a first boundary (X boundary) or on a second boundary (Z boundary). As the split quantum basic operation command is performed, the split first and second logical qubits have an entanglement state.

SPLIT_MXX splits the logical qubit merged by using the MERGE_MXX command into two logical qubits. FIG. 11A illustrates a merged logical qubit (m_n) intended to be split (1110). FIG. 11B illustrates that the merged logical qubit (m_n) is split into logical qubit (m) and logical qubit (n) (1120). In this case, the state of the merged logical qubit (m_n) is equally transferred to logical qubit (m) and logical qubit (n), and logical qubit (m) and logical qubit (n) exist in the entanglement state.

Figures 12A, 12B:
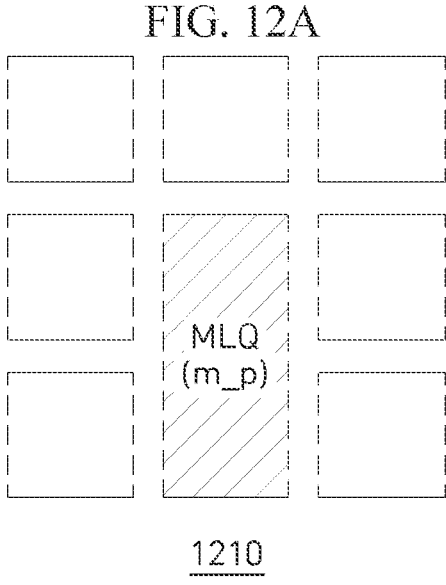
FIGS. 12A and 12B are diagrams explaining an operation method for a SPLIT_MZZ quantum basic operation command according to an embodiment of the present disclosure.

FIGS. 12A and 12B are diagrams explaining an operation method for a SPLIT_MZZ quantum basic operation command according to an embodiment of the present disclosure.

SPLIT_MZZ splits the logical qubit merged by using the MERGE_MZZ command into two logical qubits. FIG. 12A illustrates a merged logical qubit (m_p) intended to be split (1210). FIG. 12B shows that the merged logical qubit (m_p) is split into logical qubit (m) and logical qubit (p) (1220). In this case, the state of the merged logical qubit (m_p) is equally transferred to logical qubit (m) and logical qubit (p), and logical qubit (m) and logical qubit (p) exist in the entanglement state.

Figure 13A:
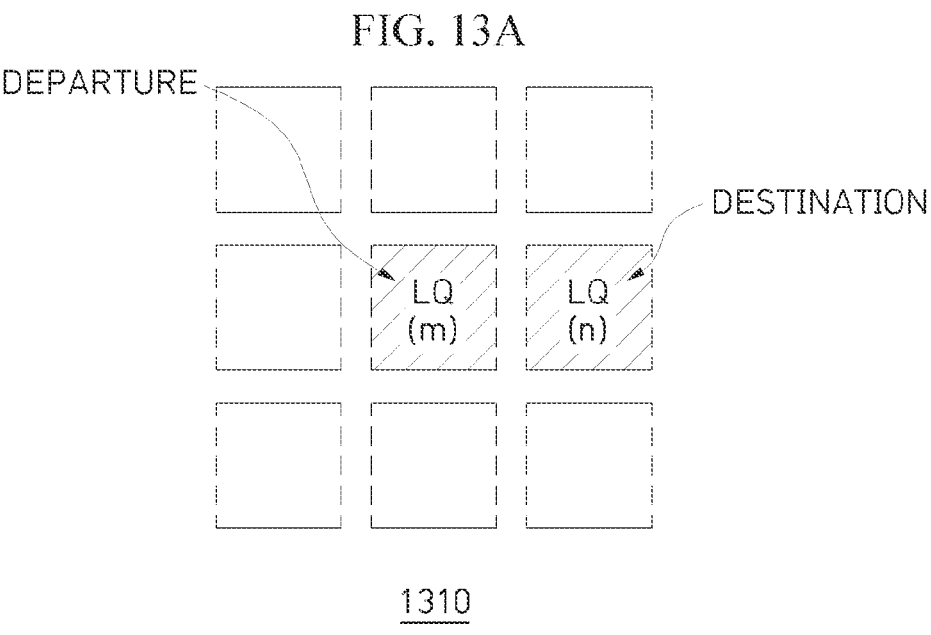
FIGS. 13A and 13B are diagrams explaining an operation method for a MOVE_POST_MXX quantum basic operation command according to an embodiment of the present disclosure.
Figure 13B:
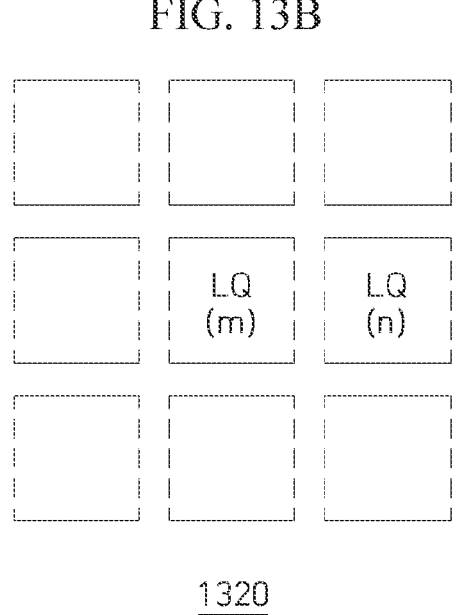

FIGS. 13A and 13B are diagrams explaining an operation method for a MOVE_POST_MXX quantum basic operation command according to an embodiment of the present disclosure.

In case that there are two logical qubits adjacent on the second boundary (Z boundary), it is possible to move the departure logical qubit state to the destination logical qubit through a MOVE_MXX quantum complex operation command. In this case, the movement post-processing quantum basic operation command MOVE_POST_MXX is a command that is performed in the last stage of execution of the movement quantum complex operation command MOVE_MXX.

FIG. 13A illustrates a state 1310 where the MERGE_MXX and SPLIT_MXX commands have already been sequentially performed for the departure logical qubit (m) and the destination logical qubit (n).

In this case, the MOVE_POST_MXX command performs logical Z operation for the second logical qubit in case that an eigenvalue of a merge measurement result of a merge quantum basic operation command in the merge quantum basic operation command group corresponding to the second boundary (Z boundary) is −1. Further, the MOVE_POST_MXX command performs logical X operation for the second logical qubit in case that an eigenvalue of a Z base measurement result of the first logical qubit is −1.

That is, if the eigenvalue of the merge measurement result of the previously performed MERGE_MXX is −1, the logical Z operation is performed for the destination logical qubit (n). Further, if the eigenvalue of the Z base measurement result of the departure logical qubit (m) is −1, the logical X operation is performed for the destination logical qubit (n).

Such results of performing the operations are as illustrated in FIG. 13B (1320). As the movement post-processing quantum basic operation command MOVE_POST_MXX is performed, the two logical qubits are in an entanglement release state.

Figure 14A:
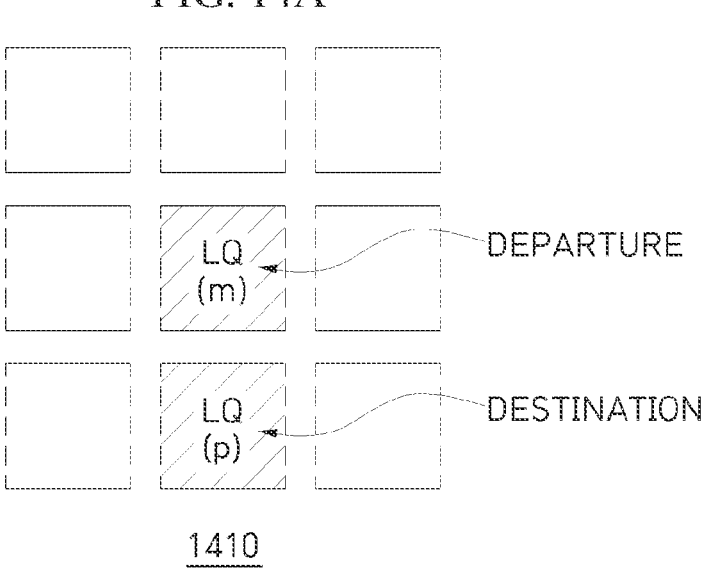
FIGS. 14A and 14B are diagrams explaining an operation method for a MOVE_POST_MZZ quantum basic operation command according to an embodiment of the present disclosure.
Figure 14B:
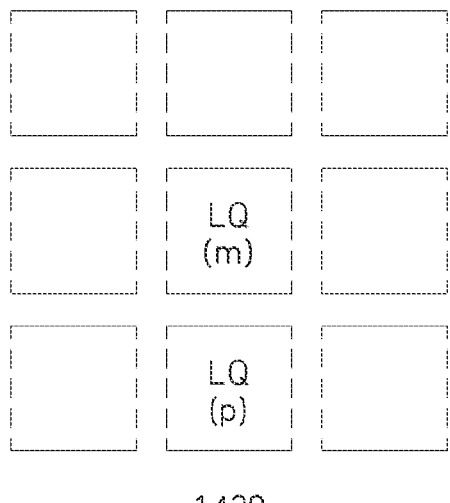

FIGS. 14A and 14B are diagrams explaining an operation method for a MOVE_POST_MZZ quantum basic operation command according to an embodiment of the present disclosure.

In case that there are two logical qubits adjacent on the first boundary (X boundary), it is possible to move the departure logical qubit state to the destination logical qubit through a MOVE_MZZ quantum complex operation command. In this case, the movement post-processing quantum basic operation command MOVE_POST_MZZ is a command that is performed in the last stage of execution of the movement quantum complex operation command MOVE_MZZ.

FIG. 14A illustrates a state 1410 where the MERGE_MZZ and SPLIT_MZZ commands have already been sequentially performed for the departure logical qubit (m) and the destination logical qubit (p).

In this case, the MOVE_POST_MZZ command performs logical X operation for the second logical qubit in case that an eigenvalue of a merge measurement result of a merge quantum basic operation command in the merge quantum basic operation command group corresponding to the first boundary (X boundary) is −1. Further, the MOVE_POST_MZZ command performs logical Z operation for the second logical qubit in case that an eigenvalue of an X base measurement result of the first logical qubit is −1.

That is, if the eigenvalue of the merge measurement result of the previously performed MERGE_MZZ is −1, the logical X operation is performed for the destination logical qubit (p). Further, if the eigenvalue of the X base measurement result of the departure logical qubit (m) is −1, the logical Z operation is performed for the destination logical qubit (p).

Such results of performing the operations are as illustrated in FIG. 14B (1420). As the movement post-processing quantum basic operation command MOVE_POST_MZZ is performed, the two logical qubits are in an entanglement release state.

Figure 15A:
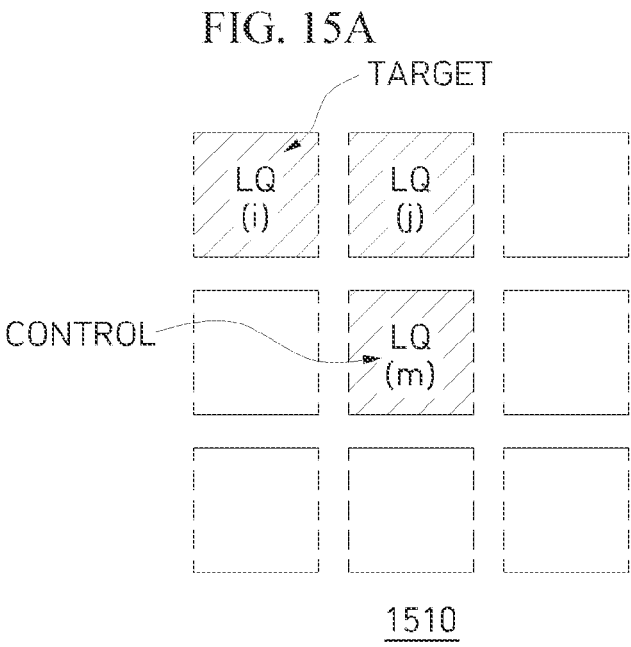
FIGS. 15A and 15B are diagrams explaining an operation method for CNOT_POST_MXX and CNOT_POST_MZZ quantum basic operation commands according to an embodiment of the present disclosure.
Figure 15B:
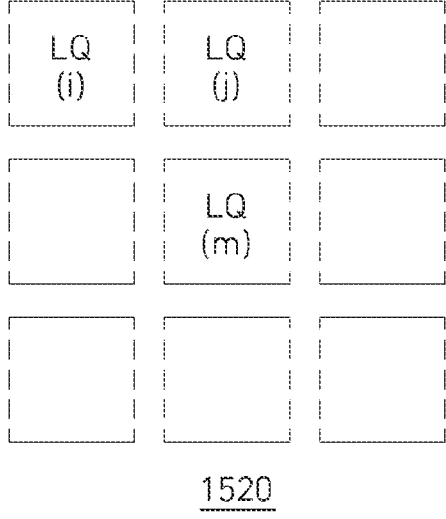

FIGS. 15A and 15B are diagrams explaining an operation method for CNOT_POST_MXX and CNOX_POST_MZZ quantum basic operation commands according to an embodiment of the present disclosure.

The CNOT quantum complex operation command is a command for performing a controlled-NOT operation in which one of two logical qubits is used as a control and the other is used as a target. The CNOT quantum complex operation command is classified into CNOT_MXX and CNOT_MZZ quantum complex operation commands.

The CNOT_POST_MXX command is a command that is performed in the last execution state of the CNOT_MXX command. Before the CNOT_POST_MXX command is performed, the MERGE_MXX, SPLIT_MXX, MERGE_MZZ, and SPLIT_MZZ commands should be sequentially performed in advance, and FIG. 15A illustrates a state where such commands have been sequentially performed (1510).

In this case, the CNOT_POST_MXX command performs logical X operation for the target logical qubit in case that an eigenvalue of a merge measurement result of a merge quantum basic operation command in the second merge quantum basic operation command group corresponding to the first boundary (X boundary) is −1. Further, the CNOT_POST_MXX command performs logical Z operation for the control logical qubit in case that only one of an eigenvalue of a merge measurement result of a merge quantum basic operation command in the first merge basic operation command group corresponding to the second boundary (Z boundary) and an eigenvalue of an X base measurement result of a intermediate logical qubit is −1.

That is, if the eigenvalue of the merge measurement result of the MERGE_MZZ is −1, the logical X operation is performed for a target logical qubit (i). Further, if only one of the eigenvalue of the merge measurement result of the MERGE_MXX and the eigenvalue of the X base measurement result of a logical qubit (j) is −1, the logical Z operation is performed for the logical qubit (m) that is used as the control. The results of performing such operations are as illustrated in FIG. 15B (1520).

Next, the CNOT_POST_MZZ command is a command that is performed in the last execution stage of the CNOT_MZZ command. Before the CNOT_POST_MZZ command is performed, the MERGE_MZZ, SPLIT_MZZ, MERGE_MXX, and SPLIT_MXX commands should be sequentially performed in advance, and FIG. 15A illustrates a state where such commands have been sequentially performed (1510).

In this case, the CNOT_POST_MZZ command performs logical Z operation for the control logical qubit in case that an eigenvalue of a merge measurement result of a merge quantum basic operation command in the second merge quantum basic operation command group corresponding to the second boundary (Z boundary) is −1. Further, the CNOT_POST_MZZ command performs logical X operation for the target logical qubit in case that only one of an eigenvalue of a merge measurement result of a merge quantum basic operation command in the first merge quantum basic operation command group corresponding to the first boundary (X boundary) and an eigenvalue of a Z base measurement result of a intermediate logical qubit is −1.

That is, if the eigenvalue of the merge measurement result of the MERGE_MXX is −1, the logical Z operation is performed for a control logical qubit (m). Further, if only one of the eigenvalue of the merge measurement result of the MERGE_MZZ and the eigenvalue of the merge measurement of the Z base measurement result of a logical qubit (j) is −1, the logical X operation is performed for the logical qubit (i) that is used as the target. The results of performing such operations are as illustrated in FIG. 15B (1520).

Next, with reference to FIGS. 16A to 20G, an operation method of a quantum complex operation command in an embodiment of the present disclosure will be described.

Meanwhile, in an embodiment of the present disclosure, the logical qubit may be classified into a data logical qubit (DLQ) and an intermediate logical qubit (ILQ) according to the role. The data logical qubit stores actual quantum data, and is used for a quantum operation. The intermediate logical qubit is a qubit that is temporarily used to perform the quantum operation between the data logical qubits, and if the quantum operation between the data logical qubits is ended, data of the intermediate logical qubit becomes unnecessary.

In an embodiment of the present disclosure, in order to perform a quantum complex operation command for the data logical qubit, a logical qubit quantum compiler selects the intermediate logical qubit, and allocates the role of the logical qubit as the data logical qubit and the intermediate logical qubit.

FIGS. 16A to 16E are diagrams explaining an operation method for a MOVE_MXX quantum complex operation command according to an embodiment of the present disclosure.

A MOVE command 300 or 400 that is a movement complex operation command among quantum complex operation commands is a quantum complex operation command for moving the state of the first logical qubit that is the departure to the second logical qubit that is the destination adjacent to the first boundary (X boundary) or the second boundary (Z boundary). In this case, the first logical qubit is the data logical qubit, and the second logical qubit is the intermediate logical qubit.

Such a movement quantum complex operation command 300 or 400 is composed of an initialization quantum basic operation command group 310 or 410, a merge quantum basic operation command group 320 or 420, a split quantum basic operation command group 330 or 430, and a movement post-processing quantum basic operation command group 340 or 440.

The initialization quantum basic operation command group 310 or 410 includes quantum basic operation commands for initializing the intermediate logical qubit.

The merge quantum basic operation command group 320 or 420 includes quantum basic operation commands for generating merge logical qubits corresponding to the second boundary (Z boundary) or the first boundary (X boundary) with respect to the first logical qubit and the second logical qubit.

The split quantum basic operation command group 330 or 430 includes a quantum basic operation command for splitting the merge logical qubit into first and second logical qubits in the entanglement state.

The movement post-processing quantum basic operation command group 340 or 440 includes a movement post-processing quantum basic operation command for moving the quantum state of the first logical qubit in the entanglement state to the second logical qubit, changing the first logical qubit to the intermediate logical qubit, and changing the second logical qubit to the data logical qubit.

Specifically, the MOVE_MXX 300 is the quantum complex operation command for moving the state of the data logical qubit that is the departure to the destination intermediate logical qubit adjacent to the second boundary (Z boundary). The operation method of the MOVE_MXX command 300 will be described with reference to FIG. 3 together.

Figure 16A:
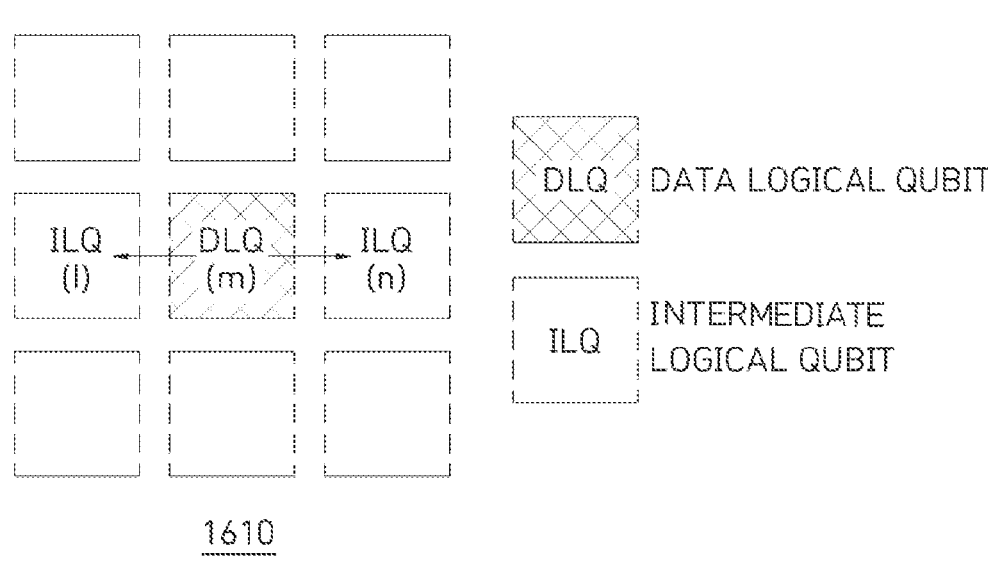
FIGS. 16A to 16E are diagrams explaining an operation method for a MOVE_MXX quantum complex operation command according to an embodiment of the present disclosure.

FIG. 16A shows an example of two kinds of movement operations between two logical qubits adjacent on the second boundary (Z boundary) (1610). The data logical qubit (m) may move to the intermediate logical qubit (l) or the intermediate logical qubit (n) adjacent to the second boundary (Z boundary). FIGS. 16B to 16E show a movement operation in which the intermediate logical qubit (n) is the destination (1620 to 1650). In this case, the movement operation in which the intermediate logical qubit (l) is the destination is performed in the same manner.

Figure 16B:
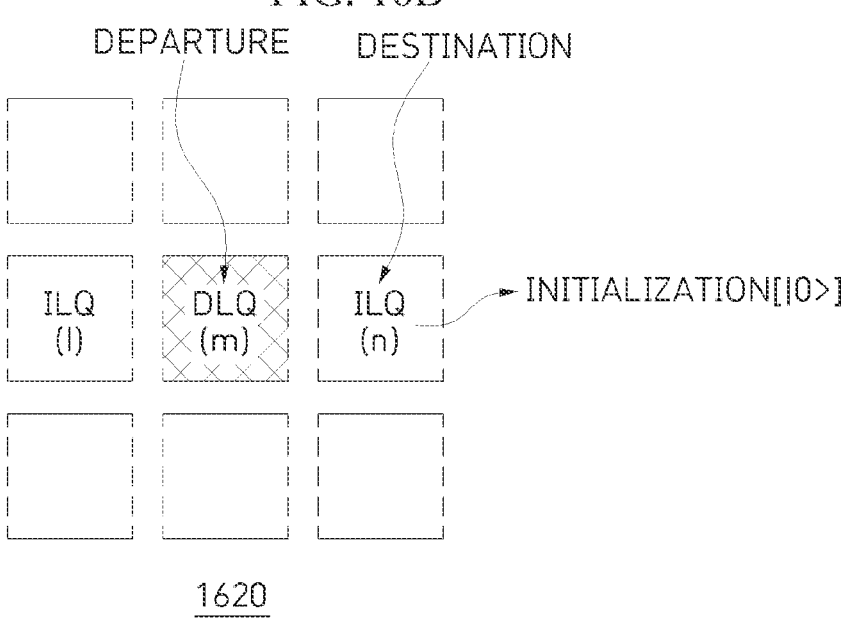

FIG. 16B illustrates the result of initializing the intermediate logical qubit (n) to |0> state by performing an INIT quantum basic operation command of the quantum basic operation command group 1 (initialization quantum basic operation command group 310) of FIG. 3 (1620).

Figure 16C:
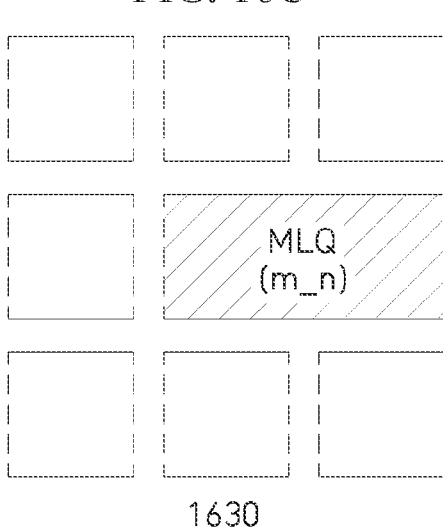

FIG. 16C illustrates the result of generating the merge logical qubit (m_n) by performing a MERGE_MXX quantum basic operation command of the quantum basic operation command group 2 (merge quantum basic operation command group 320) of FIG. 3 (1630).

Figure 16D:
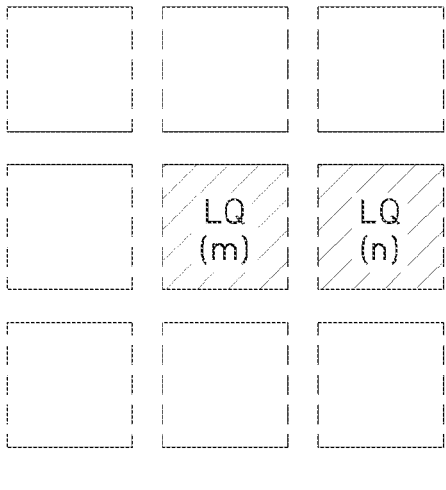

FIG. 16D illustrates the result of splitting the merge logical qubit (m_n) into logical qubit (m) and logical qubit (n) by performing the SPLIT_MXX quantum basic operation command of quantum basic operation command group 3 (split quantum basic operation command group 330) of FIG. 3 (1640).

Figure 16E:
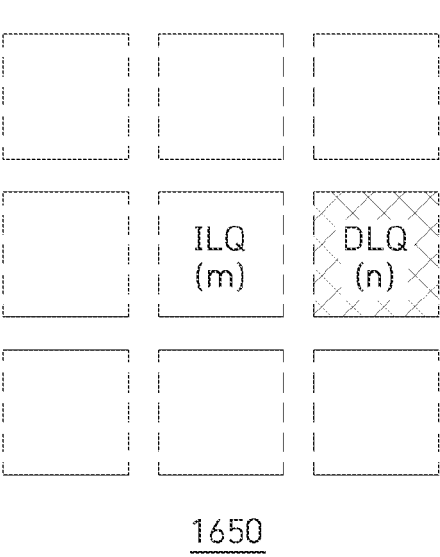

FIG. 16E illustrates the result of completing the performing of a MOVE_POST_MXX quantum basic operation command of quantum basic operation command group 4 (movement post-processing quantum basic operation command group 340) of FIG. 3 (1650).

In this case, if the movement operation is completed, the quantum state of the data logical qubit (m) that is at the departure is moved to the intermediate logical qubit (n). Further, the role of the intermediate logical qubit (n) before the movement is changed to that of the data logical qubit (n) after the movement, and the data logical qubit (m) before the movement is changed to the intermediate logical qubit (m) after the movement.

FIGS. 17A to 17E are diagrams explaining an operation method for a MOVE_MZZ quantum complex operation command according to an embodiment of the present disclosure.

A MOVE_MZZ quantum complex operation command 400 is a quantum complex operation command for moving the state of the data logical qubit that is the departure to the destination intermediate logical qubit adjacent to the first boundary (X boundary). The operation method of the MOVE_MZZ command 400 according to FIGS. 17A to 17E will be described with reference to FIG. 4 together.

Figure 17A:
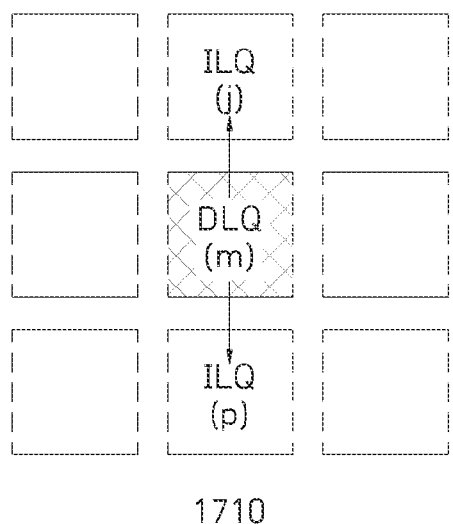
FIGS. 17A to 17E are diagrams explaining an operation method for a MOVE_MZZ quantum complex operation command according to an embodiment of the present disclosure.

FIG. 17A shows an example of two kinds of movement operations between two logical qubits adjacent to the first boundary (X boundary) (1710). The data logical qubit (m) may move to the intermediate logical qubit (j) or the intermediate logical qubit (p) adjacent to the first boundary (X boundary). FIGS. 17B to 17E show a movement operation in which the intermediate logical qubit (j) is the destination. In this case, the movement operation in which the intermediate logical qubit (p) is the destination is performed in the same manner.

Figure 17B:
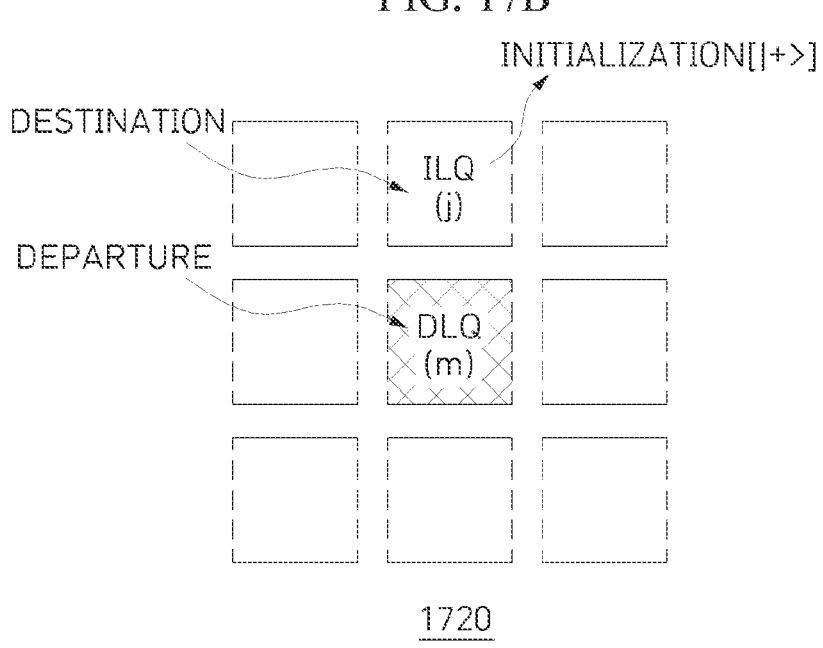

FIG. 17B illustrates the result of initializing the intermediate logical qubit (j) to |+> state by performing an INIT quantum basic operation command of the quantum basic operation command group 1 (initialization quantum basic operation command group 410) of FIG. 4 (1720).

Figure 17C:
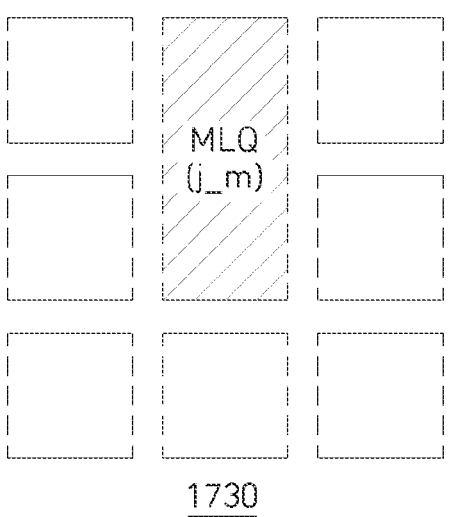

FIG. 17C illustrates the result of generating the merge logical qubit (j_m) by performing a MERGE_MZZ quantum basic operation command of the quantum basic operation command group 2 (merge quantum basic operation command group 420) of FIG. 4 (1730).

Figure 17D:
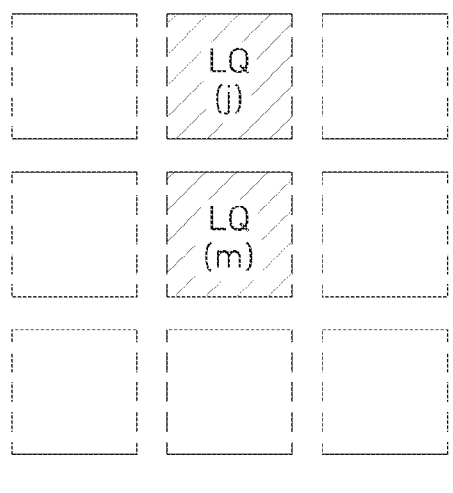

FIG. 17D illustrates the result of splitting the merge logical qubit (j_m) into logical qubit (j) and logical qubit (m) by performing the SPLIT_MZZ quantum basic operation command of quantum basic operation command group 3 (split quantum basic operation command group 430) of FIG. 3 (1740).

Figure 17E:
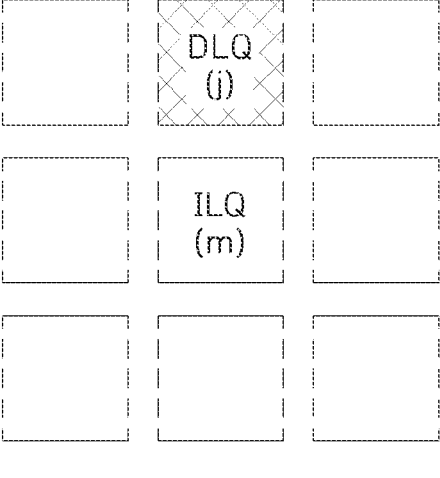

FIG. 17E illustrates the result of completing the performing of a MOVE_POST_MZZ quantum basic operation command of quantum basic operation command group 4 (movement post-processing quantum basic operation command group 440) of FIG. 4 (1750).

In this case, if the movement operation is completed, the quantum state of the data logical qubit (m) that is at the departure is moved to the intermediate logical qubit (j). Further, the role of the intermediate logical qubit (j) before the movement is changed to that of the data logical qubit (j) after the movement, and the data logical qubit (m) before the movement is changed to the intermediate logical qubit (m) after the movement.

FIGS. 18A to 18l are diagrams explaining an operation method of SWAP quantum complex operation command according to an embodiment of the present disclosure.

The SWAP command 500 that is a swap quantum complex operation command among quantum complex operation commands is a quantum complex operation command for performing swapping of the first logical qubit and the second logical qubit with each other. In this case, the first and second logical qubits are data logical qubits, and third and fourth logical qubits located on the first and second boundaries (X and Z boundaries) of the first and second logical qubits are intermediate logical qubits.

The SWAP quantum complex operation command 500 as described above is composed of first and second initialization quantum basic operation command groups 510 and 550, first and second merge quantum basic operation command groups 520 and 560, first and second split quantum basic operation command groups 530 and 570, and first and second movement post-processing quantum basic operation command groups 540 and 580.

The first initialization quantum basic operation command group 510 includes quantum basic operation command for initializing third and fourth logical qubits.

The first merge quantum basic operation command group 520 includes quantum basic operation commands for merging first and third logical qubits and merging second and fourth logical qubits.

The split quantum basic operation command group 530 includes quantum basic operation commands for splitting the merged merge logical qubits into first and third logical qubits and second and fourth logical qubits that are in the entanglement state.

The first movement post-processing quantum basic operation command group 540 includes quantum basic operation commands for moving the quantum state of the first and second logical qubits in the entanglement state to the third and four logical qubits, and changing the third and fourth logical qubits to the data logical qubits corresponding to the first and second logical qubits.

Next, the second initialization quantum basic operation command group 550 includes quantum basic operation commands for initializing the first and second logical qubits having been changed to the intermediate logical qubits.

The second merge quantum basic operation command group 560 includes quantum basic operation commands for merging the first and fourth logical qubits located on the first boundary (X boundary), and for merging the second and third logical qubits.

The second split quantum basic operation command group 570 includes quantum basic operation commands for splitting the merge logical qubits merged into the first and fourth logical qubits located on the first boundary (X boundary), and into the second and third logical qubits.

The second movement post-processing quantum basic operation command group 580 includes quantum basic operation commands for moving the quantum state of the third and fourth logical qubits in the entanglement state to the second and first logical qubits, and for changing the second and first logical qubits to the data logical qubits corresponding to the third and fourth logical qubits.

FIGS. 18A to 18l show an operation method of the SWAP quantum complex operation command 500, and this will be described together with the contents of FIG. 5.

Figures 18A, 18B:
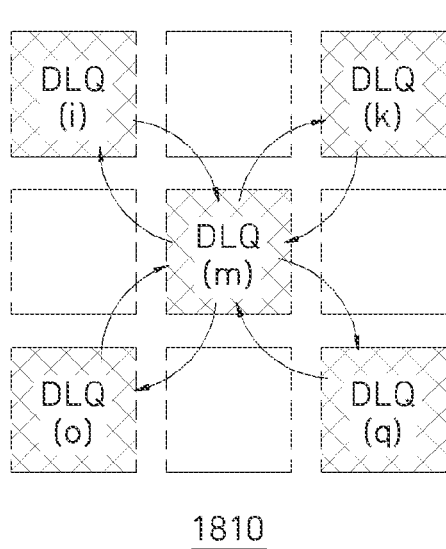

First, FIG. 18A shows four kinds of data logical qubits capable of performing the SWAP operation with data logical qubit (m) (1810). Data logical qubit (m) may perform the SWAP operation with data logical qubit (i), data logical qubit (k), data logical qubit (o), and data logical qubit (q).

FIGS. 18B to 18l show an example of swapping the states of data logical qubit (m) and data logical qubit (k) with each other. In this case, the swap operation for the three remaining data logical qubits is performed in the same manner.

FIG. 18B illustrates the result of initializing two intermediate logical qubits to be used for the SWAP operation to the |0> state by performing in parallel two INIT commands included in quantum basic operation command group 1 (first initialization quantum basic operation command group 510) of FIG. 5 (1820). For the SWAP operation, the temporarily logical qubit (j) and the intermediate logical qubit (n) are used.

Figure 18C:
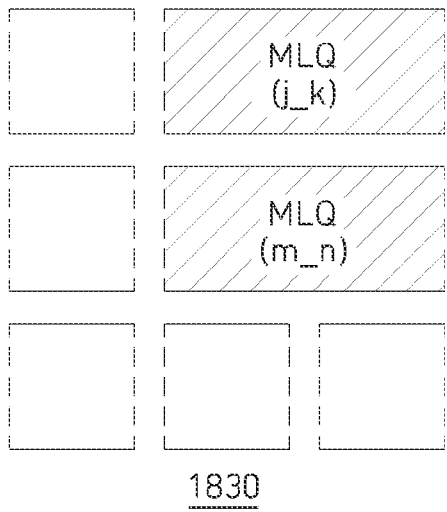

FIG. 18C illustrates the result of generating merge logical qubit (i_k) and merge logical qubit (m_n) by performing in parallel two MERGE_MXX commands included in quantum basic operation command group 2 (first merge quantum basic operation command group 520) of FIG. 5 (1830).

Figure 18D:
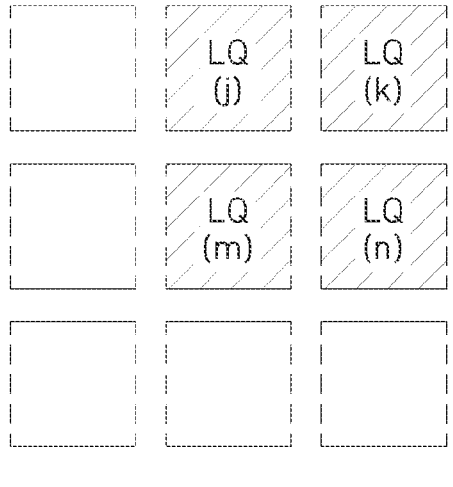

FIG. 18D illustrates the result of splitting the merge logical qubit (j, k) into logical qubit (j) and logical qubit (k) and splitting merge logical qubit (m, n) into logical qubit (m) and logical qubit (n) by performing in parallel two SPLIT_MXX commands included in quantum basic operation command group 3 (first split quantum basic operation command group 530) of FIG. 5 (1840).

Figure 18E:
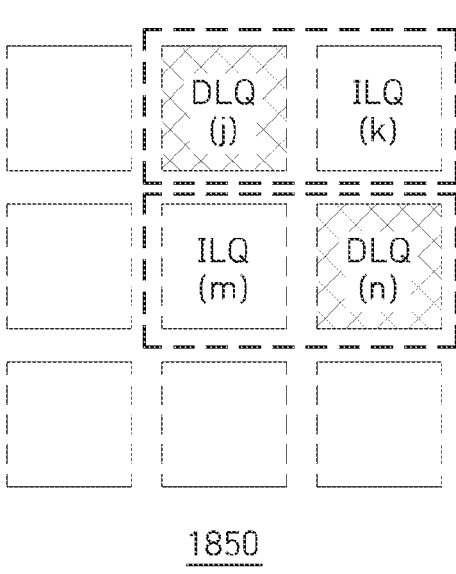

FIG. 18E illustrates the result of performing in parallel two MOVE_POST_MXX commands included in quantum basic operation command group 4 (first movement post-processing quantum basic operation command group 540) of FIG. 5 (1850). As the result of the operation of FIG. 18E, the state of data logical qubit (m) is moved to data logical qubit (n), and the state of data logical qubit (k) is moved to data logical qubit (j).

Figure 18F:
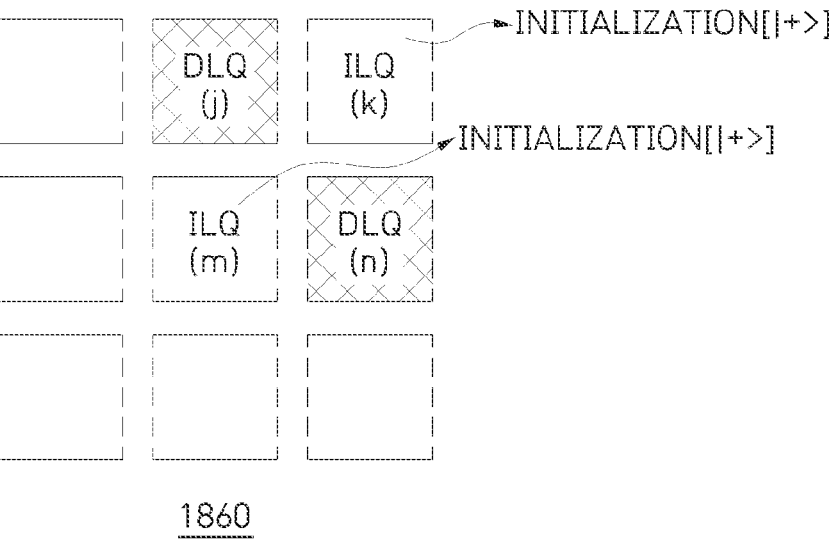

FIG. 18F illustrates the result of initializing intermediate logical qubit (k) and intermediate logical qubit (m) to the |+> state by performing in parallel two INIT commands included in quantum basic operation command group 5 (second initialization quantum basic operation command group 550) of FIG. 5 (1860).

Figure 18G:
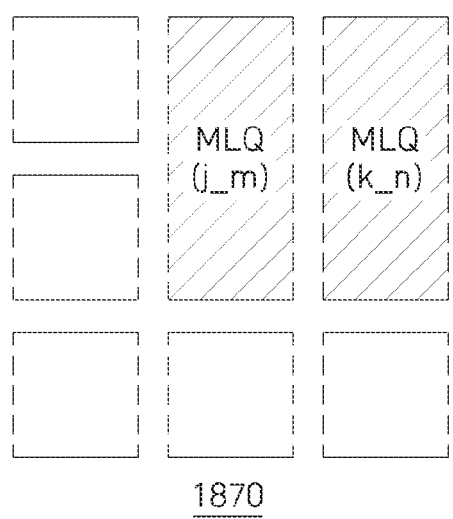

FIG. 18G illustrates the result of generating merge logical qubit (j_m) and merge logical qubit (k_n) by performing in parallel two MERGE_MZZ commands included in quantum basic operation command group 6 (second merge quantum basic operation command group 560) of FIG. 5 (1870).

Figure 18H:
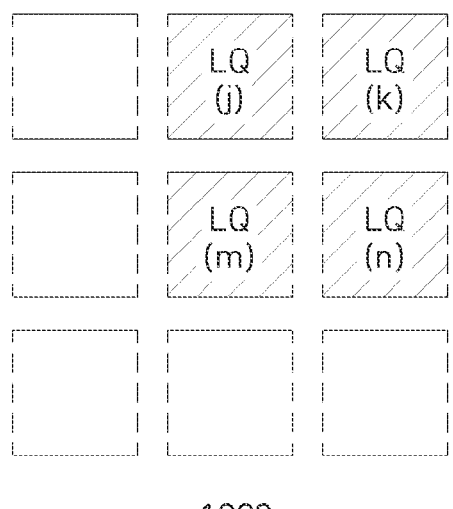

FIG. 18H illustrates the result of splitting merge logical qubit (j_m) into logical qubit (j) and logical qubit (m) and splitting merge logical qubit (k_n) into logical qubit (k) and logical qubit (n) by performing in parallel two SPLIT_MZZ commands included in quantum basic operation command group 7 (second split quantum basic operation command group 570) of FIG. 5 (1880).

Figure 18I:
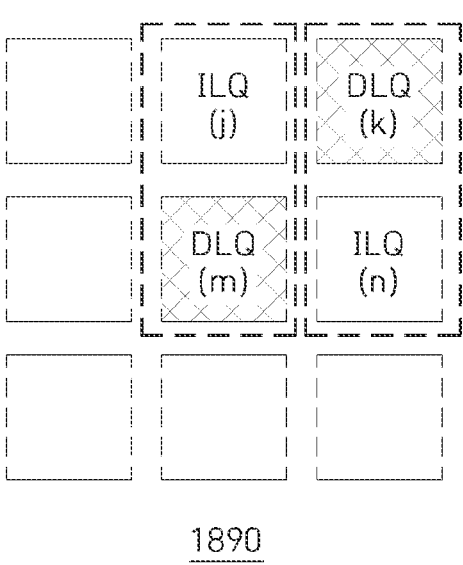

FIG. 18I illustrates the result of performing in parallel two MOVE_POST_MZZ commands included in quantum basic operation command group 8 (second movement post-processing quantum basic operation command group 580) of FIG. 5 (1890). As the result of the operation of FIG. 18I, the state of data logical qubit (j) is moved to data logical qubit (m), and the state of data logical qubit (n) is moved to data logical qubit (k).

In accordance with the SWAP quantum complex operation command 500, the states of data logical qubit (k) and data logical qubit (m) are finally swapped through the processes of FIGS. 18B to 181.

FIGS. 19A to 19G are diagrams explaining an operation method of CNOT_MXX quantum complex operation command according to an embodiment of the present disclosure.

The CNOT quantum complex operation command 600 or 700 among quantum complex operation commands is a quantum complex operation command for performing a controlled-NOT operation in which any one of a first logical qubit and a second logical qubit is used as a control and a target. In this case, the first and second logical qubits are data logical qubits.

The CNOT quantum complex operation command 600 and 700 as described above may include an initialization quantum basic operation command groups 610 or 710, first and second merge quantum basic operation command groups 620 and 640, or 720 and 740, first and second split quantum basic operation command groups 630 and 650, or 730 and 750, and a CNOT post-processing quantum basic operation command group 660 or 760.

The initialization quantum basic operation command group 610 or 710 include quantum basic operation commands for initializing intermediate logical qubits to be used for the CNOT operation.

The first merge quantum basic operation command group 620 or 720 includes quantum basic operation commands for generating a first merge logical qubit corresponding to the second boundary (Z boundary) or the first boundary (X boundary) with respect to the first logical qubit and the intermediate logical qubit.

The first split quantum basic operation command group 630 or 730 includes quantum basic operation commands for splitting the first merge logical qubit into the first logical qubit and the intermediate logical qubit in the entanglement state.

The second merge quantum basic operation command group 640 or 740 includes quantum basic operation commands for generating a second merge logical qubit corresponding to the first boundary (X boundary) or the second boundary (Z boundary) with respect to the intermediate logical qubit that is in the entanglement state with the second logical qubit.

The second split quantum basic operation command group 650 or 750 includes quantum basic operation commands for splitting the second merge logical qubit into the second logical qubit and the intermediate logical qubit that are in the entanglement state.

The CNOT post-processing quantum basic operation command group 660 or 760 includes quantum basic operation commands for releasing the entanglement state of the first logical qubit and the second logical qubit that are in the entanglement state.

FIGS. 19A to 19G show an operation method of the CNOT_MXX command 600, and this will be described together with the contents of FIG. 6.

Figure 19A:
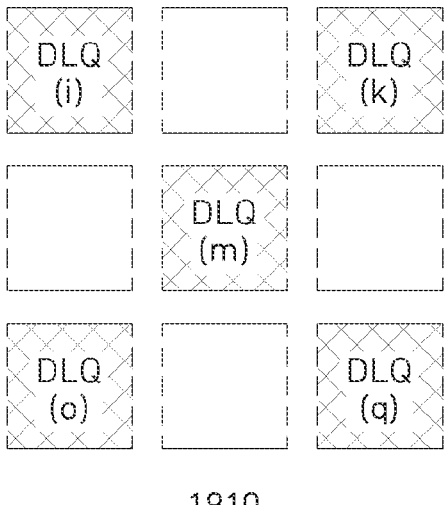
FIGS. 19A to 19G are diagrams explaining an operation method for a CNOT_MXX quantum complex operation command according to an embodiment of the present disclosure.

First, FIG. 19A shows four kinds of target data logical qubits capable of performing the CNOT operation when data logical qubit (m) is used as the control (1910). Data logical qubit (m) may perform the CNOT operation with data logical qubit (i), data logical qubit (k), data logical qubit (o), and data logical qubit (q).

FIGS. 19B to 19G show an example of the result of performing the CNOT command in which data logical qubit (i) is used as the target. In this case, the CNOT operation for the three remaining data logical qubits is performed in the same manner.

The CNOT performing command may be classified into two: MOVE_MXX 600 and CNOT_MZZ 700. The CNOT_MXX 600 is a method for firstly merging data logical qubit (i) to be used as the target with intermediate logical qubit (j), and CNOT_MZZ is a method for firstly merging data logical qubit (m) to be used as the control with intermediate logical qubit (j). FIGS. 19A to 19G are diagrams explaining a method for performing the CNOT_MXX 600, and FIGS. 20A to 20G are diagrams explaining a method for performing the CNOT_MZZ 700.

Figures 19B, 19C:
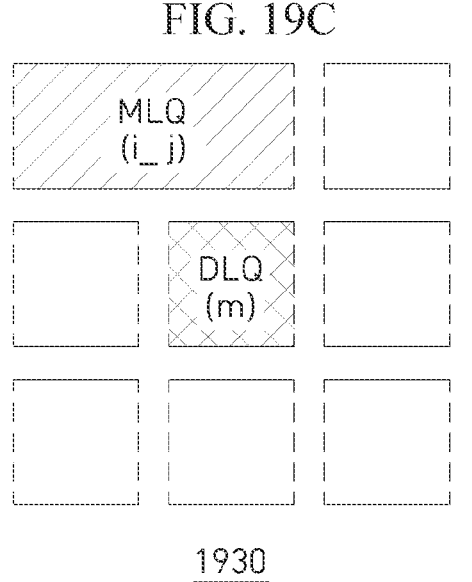

FIG. 19B illustrates the result of initializing intermediate logical qubit (j) to be used for the CNOT operation to the |0> state by performing an INIT command of quantum basic operation command group 1 (initialization quantum basic operation command group 610) of FIG. 6 (1920).

FIG. 19C illustrates the result of generating merge logical qubit (i_j) by performing the MERGE_MXX command of quantum basic operation command group 2 (first merge quantum basic operation command group 620) of FIG. 6 (1930).

Figure 19D:
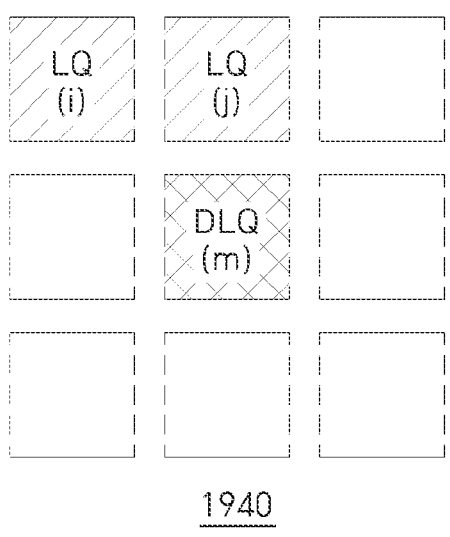

FIG. 19D illustrates the result of splitting merge logical qubit (i_j) into logical qubit (i) and logical qubit (j) by performing the SPLIT_MXX command of quantum basic operation command group 3 (first split quantum basic operation command group 630) of FIG. 6 (1940).

Figure 19E:
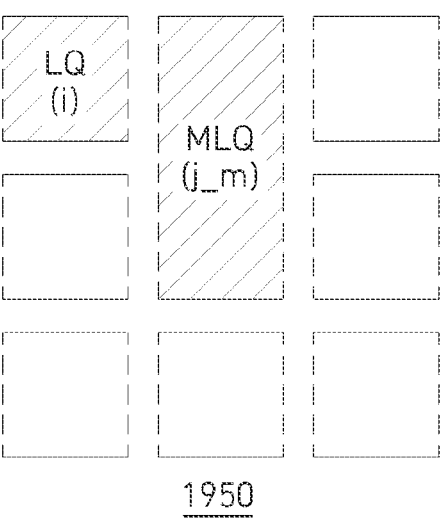

FIG. 19E illustrates the result of generating merge logical qubit (j_m) by performing the MERGE_MZZ command of quantum basic operation command group 4 (second merge quantum basic operation command group 640) of FIG. 6 (1950).

Figures 19F, 19G:
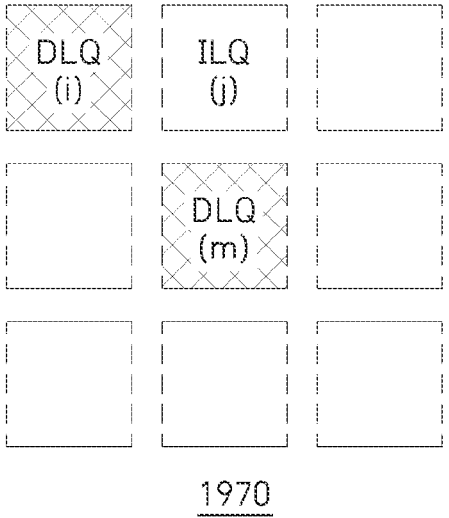

FIG. 19F illustrates the result of splitting merge logical qubit (j_m) into logical qubit (j) and logical qubit (m) by performing SPLIT_MZZ command of quantum basic operation command group 5 (second split quantum basic operation command group 650) of FIG. 6 (1960).

FIG. 19G illustrates the result of completing the CNOT operation by performing the CNOT_POST_MXX command of quantum basic operation command group 6 (CNOT post-processing quantum basic operation command group 660) of FIG. 6 (1970).

FIGS. 20A to 20G are diagrams explaining an operation method for a CNOT_MZZ quantum complex operation command according to an embodiment of the present disclosure. FIGS. 20A to 20G show an operation method of CNOT_MZZ command, and this will be described together with FIG. 7.

Figure 20A:
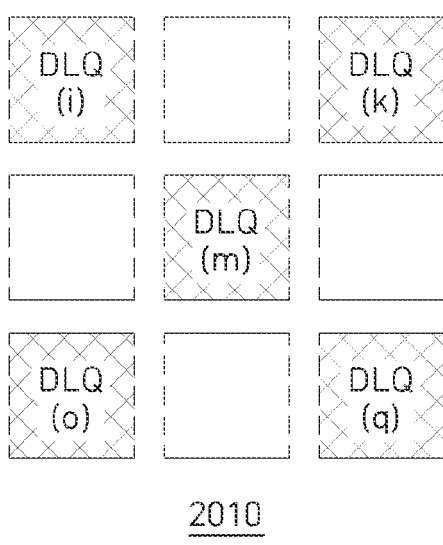
FIGS. 20A to 20G are diagrams explaining an operation method for a CNOT_MZZ quantum complex operation command according to an embodiment of the present disclosure.

FIG. 20A shows 4 kinds of target data logical qubits capable of performing a CNOT operation when data logical qubit (m) is used as a control (2010). FIGS. 20B to 20G show an example of the CNOT in which data logical qubit (m) is used as the control, and data logical qubit (i) is used as a target. In this case, the CNOT operation for the three remaining data logical qubits is performed in the same manner.

Figure 20B:
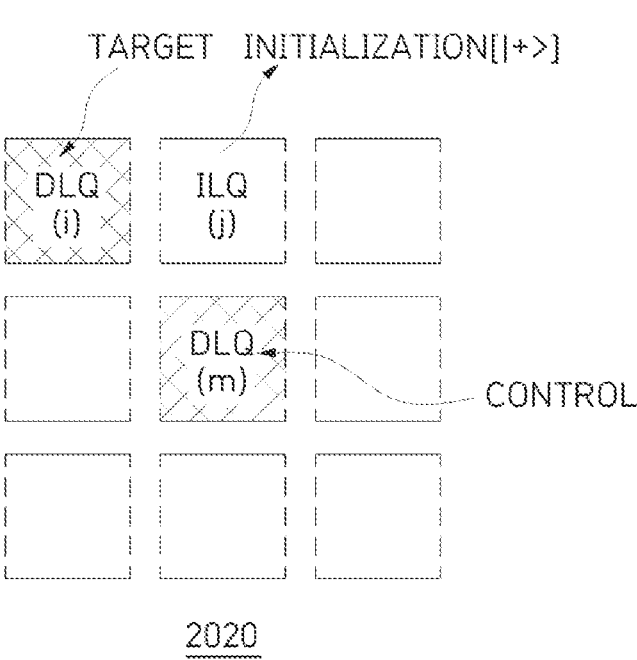

FIG. 20B illustrates the result of initializing the intermediate logical qubit (j) to |+> state by performing an INIT command of the quantum basic operation command group 1 (initialization quantum basic operation command group 710) of FIG. 7 (2020).

Figure 20C:
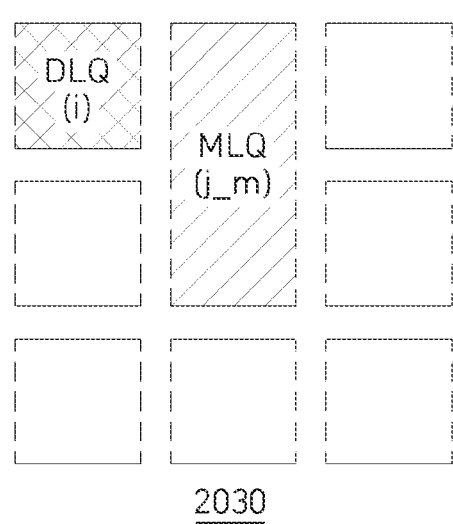

FIG. 20C illustrates the result of generating the merge logical qubit (j_m) by performing a MERGE_MZZ command of the quantum basic operation command group 2 (first merge quantum basic operation command group 720) of FIG. 7 (2030).

Figure 20D:
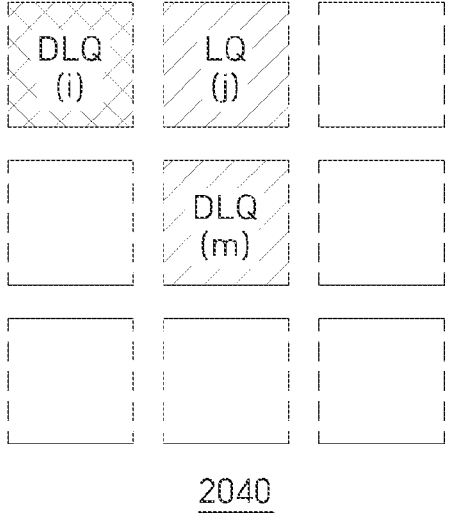

FIG. 20D illustrates the result of splitting the merge logical qubit (j_m) into logical qubit (i) and logical qubit (m) by performing the SPLIT_MZZ command of quantum basic operation command group 3 (first split quantum basic operation command group 730) of FIG. 7 (2040).

Figure 20E:
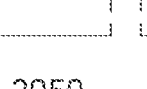

FIG. 20E illustrates the result of generating the merge logical qubit (i_j) by performing the MERGE_MXX command of quantum basic operation command group 4 (second merge quantum basic operation command group 740) of FIG. 7 (2050).

Figure 20F:
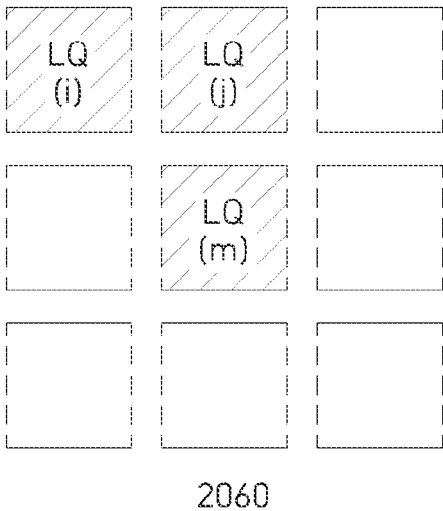

FIG. 20F illustrates the result of splitting the merge logical qubit (i_j) into logical qubit (i) and logical qubit (j) by performing the SPLIT_MXX command of quantum basic operation command group 5 (second split quantum basic operation command group 750) of FIG. 7 (2060).

Figure 20G:
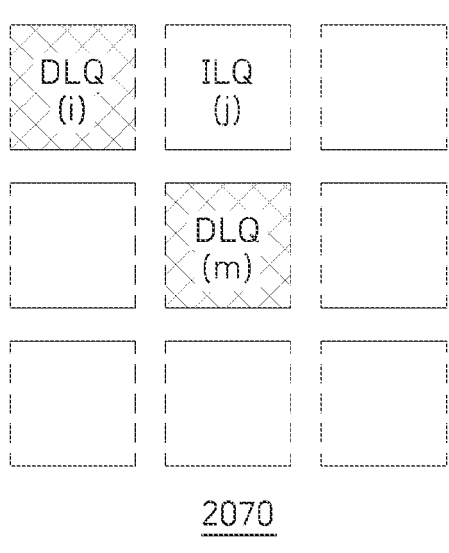

FIG. 20G illustrates the result of completing the CNOT operation by performing the CNOT_POST_MZZ command of quantum basic operation command group 6 (CNOT post-processing quantum basic operation command group 760) of FIG. 7 (2070).

Hereinafter, with reference to FIG. 21, an operation method performed by a quantum computing system 800 according to an embodiment of the present disclosure will be described.

Figure 21:
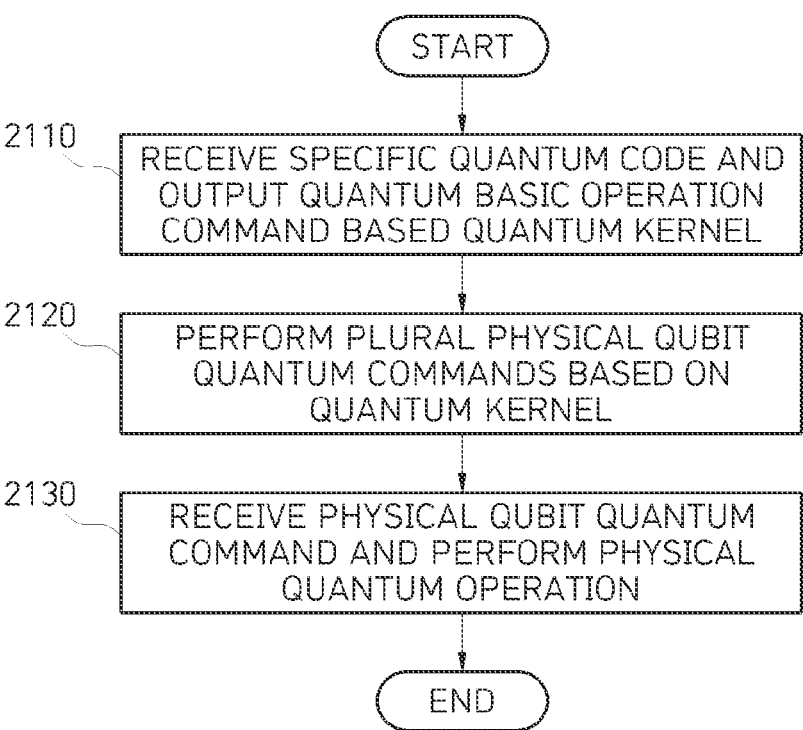
FIG. 21 is a flowchart of an operation method according to an embodiment of the present disclosure.

FIG. 21 is a flowchart of an operation method according to an embodiment of the present disclosure.

First, a logical qubit quantum compiler 810 receives a specific quantum code, and outputs a quantum kernel based on a quantum basic operation command (2110).

Next, a logical qubit quantum kernel executor 820 generates a plurality of physical qubit quantum commands based on the output quantum kernel (2120).

Next, a physical qubit quantum system 830 receives the physical qubit quantum command and performs a physical quantum operation (2130).

Meanwhile, in the above-described description, steps S2110 to S2130 may be further divided into additional steps or may be combined into fewer steps depending on the implementation example of the present disclosure. Further, as needed, some steps may be omitted, or the order of the steps may be changed. In addition, even in case of other omitted contents, the contents of FIGS. 1 to 20G may be applied even to the quantum simulation method of FIG. 21.

An embodiment of the present disclosure as described above may be implemented as a program (or application) to be executed in combination with a hardware computer, and may be stored in a medium.

In order for the computer to read the above described program so as to execute the above methods, the program may include a code coded by a computer language, such as C, C++, JAVA, Ruby, and machine language, which can be read by a processor (CPU) of the computer through a device interface of the computer. Such a code may include a functional code related to a function that defines functions necessary to execute the above methods, and may include a control code related to an execution procedure necessary for the processor of the computer to execute the above functions according to a specific procedure. Further, such a code may further include additional information necessary for the processor of the computer to execute the above functions or a memory reference related code regarding at which location (address) of an internal or external memory of the computer the media is to be referred to. Further, in case that the processor of the computer is required to communicate with any other remote computer or server to execute the above functions, the code may further include a communication related code regarding how to communicate with any other remote computer or server by using a communication module of the computer, or which information or media is to be transmitted/received during the communication.

The storage medium means a medium which semi-permanently stores data and which can be read by a device, rather than a medium which stores data for a brief moment, such as a register, cache, or memory. Specific examples of the storage medium include ROM, RAM, CD-ROM, magnetic tape, floppy disc, and optical data storage device, but the present disclosure is not limited thereto. That is, the program may be stored in various recording media on various servers that can be accessed by the computer, or various recording media on a user's computer. Further, the media may be distributed in a computer system connected through a network, and may store a code that can be read by the computer in a distributed manner.

The above explanation of the present disclosure is for illustrative purposes, and it can be understood by those of ordinary skill in the art to which the present disclosure pertains that the present disclosure can be easily modified in other specific forms without changing the technical idea or essential features of the present disclosure. Accordingly, it should be understood that the above-described embodiments are illustrative in all aspects, not restrictive. For example, each constituent element explained as a single type may be distributed and carried out, and in the same manner, constituent elements explained as being distributed may be carried out in a combined form.

The scope of the present disclosure is defined by the appended claims to be described later rather than the above-described detailed description, and all changes or modifications derived from the meanings, scope, and equivalent concept of the claims should be interpreted as being included in the scope of the present disclosure.

What is claimed is:

1. A quantum computing system comprising:
a logical qubit quantum compiler configured to receive a specific quantum code and to output a quantum kernel based on a quantum basic operation command;
a logical qubit quantum kernel executor configured to generate a plurality of physical qubit quantum commands based on the quantum kernel; and
a physical qubit quantum system configured to receive the physical qubit quantum command and to perform a physical quantum operation,
wherein the logical qubit quantum compiler comprises:
a quantum complex operation command combiner configured to decompose the input quantum code into a combination of quantum complex operation commands and to generate a quantum complex operation command based code; and
a quantum basic operation command generator configured to receive and decompose the quantum complex operation command based code into quantum basic operation commands and to generate a quantum kernel based on the quantum basic operation commands,
wherein the logical qubit quantum kernel executor comprises:
a quantum basic operation command decomposition block configured to receive the quantum kernel and to decompose a quantum basic operation command into a plurality of physical qubit quantum commands; and
a physical qubit quantum command optimizer configured to perform optimization and scheduling of the decomposed physical qubit quantum commands so as to correspond to the physical qubit quantum system, and
wherein the logical qubit quantum compiler is configured to select an intermediate logical qubit for an operation of a data logical qubit and to perform a parallel and sequential execution scheduling for at least one quantum basic operation command related to the intermediate logical qubit, at the quantum compiling time before the actual quantum operation is performed.

2. The quantum computing system of claim 1, wherein the logical qubit quantum compiler is configured to select a intermediate logical qubit for an operation of a data logical qubit and to perform a parallel and sequential execution scheduling for at least one quantum basic operation command constituting the quantum complex operation command.

3. The quantum computing system of claim 1, wherein the quantum complex operation command includes n (n is a natural number) quantum basic operation command groups, and the quantum basic operation command group includes k (k is a natural number) quantum basic operation commands, and
wherein the quantum basic operation command groups are sequentially performed in accordance with a determined time, and the quantum basic operation commands in the quantum basic operation command group are performed in parallel to each other.

4. The quantum computing system of claim 1, wherein a merge quantum basic operation command among the quantum basic operation commands is the quantum basic operation command for merging a first logical qubit and a second logical qubit neighboring on a first boundary or a second boundary into one logical qubit, and
as the merge quantum basic operation command is performed, the merged logical qubit has an entanglement state of the first and second logical qubits.

5. The quantum computing system of claim 4, wherein the logical qubit quantum kernel executor comprises a merge logical qubit measurement result storage configured to store a merge measurement result of the merge quantum basic operation command.

6. The quantum computing system of claim 4, wherein a split quantum basic operation command among the quantum basic operation commands is the quantum basic operation command for splitting the merged logical qubit into the first logical qubit and the second logical qubit neighboring on the first boundary or the second boundary, and
as the split quantum basic operation command is performed, the split first and second logical qubits are in an entanglement state.

7. The quantum computing system of claim 1, wherein a movement quantum complex operation command among the quantum complex operation commands is the quantum complex operation command for moving the state of a first logical qubit that is a departure to a second logical qubit that is a destination adjacent to a first boundary or a second boundary, and
the first logical qubit is a data logical qubit, and the second logical qubit is a intermediate logical qubit.

8. The quantum computing system of claim 7, wherein the movement quantum complex operation command comprises:
an initialization quantum basic operation command group for initializing the intermediate logical qubit;
a merge quantum basic operation command group for generating a merge logical qubit corresponding to the first boundary or the second boundary with respect to the first logical qubit and the second logical qubit;
a split quantum basic operation command group for splitting the merge logical qubit into the first and second logical qubits in an entanglement state; and
a movement post-processing quantum basic operation command group for moving a quantum state of the first logical qubit in the entanglement state to the second logical qubit, changing the first logical qubit to the intermediate logical qubit, and changing the second logical qubit to the data logical qubit.

9. The quantum computing system of claim 8, wherein a movement post-processing quantum basic operation command of the movement post-processing quantum basic operation command group performs a logical Z operation for the second logical qubit in case that an eigenvalue of a merge measurement result of a merge quantum basic operation command in the merge quantum basic operation command group corresponding to the second boundary is −1, and performs a logical X operation for the second logical qubit in case that an eigenvalue of a Z base measurement result of the first logical qubit is −1.

10. The quantum computing system of claim 8, wherein a movement post-processing quantum basic operation command of the movement post-processing quantum basic operation command group performs a logical X operation for the second logical qubit in case that an eigenvalue of a merge measurement result of a merge quantum basic operation command in the merge quantum basic operation command group corresponding to the first boundary is −1, and performs a logical Z operation for the second logical qubit in case that an eigenvalue of an X base measurement result of the first logical qubit is −1.

11. The quantum computing system of claim 1, wherein a CNOT quantum complex operation command among the quantum complex operation commands is the quantum complex operation command for performing a controlled-NOT operation that uses any one of a first logical qubit and a second logical qubit as a control and a target, and the first and second logical qubits are data logical qubits.

12. The quantum computing system of claim 11, wherein the CNOT quantum complex operation command comprises:

an initialization quantum basic operation command group for initializing a intermediate logical qubit;

a first merge quantum basic operation command group for generating a first merge logical qubit corresponding to the first boundary or the second boundary with respect to the first logical qubit and the intermediate logical qubit;

a first split quantum basic operation command group for splitting the first merge logical qubit into the first logical qubit and the intermediate logical qubit that are in an entanglement state;

a second merge quantum basic operation command group for generating a second merge logical qubit corresponding to the second boundary or the first boundary with respect to the second logical qubit and the intermediate logical qubit in the entanglement state;

a second split quantum basic operation command group for splitting the second merge logical qubit into the second logical qubit and the intermediate logical qubit in the entanglement state; and a CNOT post-processing quantum basic operation command group for releasing the entanglement state for the first and second logical qubits and the intermediate logical qubit in the entanglement state.

13. The quantum computing system of claim 12, wherein a CNOT post-processing quantum basic operation command of the CNOT post-processing quantum basic operation command group performs a logical X operation for a logical qubit that is a target, in case that an eigenvalue of a merge measurement result of a merge quantum basic operation command in the second merge quantum basic operation command group corresponding to the first boundary is −1, and performs a logical Z operation for a logical qubit that is a control, in case that only one of an eigenvalue of a merge measurement result of a merge quantum basic operation command in the first merge quantum basic operation command group corresponding to the second boundary and an eigenvalue of an X base measurement result of a intermediate logical qubit is −1.

14. The quantum computing system of claim 12, wherein a CNOT post-processing quantum basic operation command of the CNOT post-processing quantum basic operation command group performs a logical Z operation for a logical qubit that is a control, in case that an eigenvalue of a merge measurement result of a merge quantum basic operation command in the second merge quantum basic operation command group corresponding to the second boundary is −1, and performs a logical X operation for a logical qubit that is a target, in case that only one of an eigenvalue of a merge measurement result of a merge quantum basic operation command in the first merge quantum basic operation command group corresponding to the first boundary and an eigenvalue of a Z base measurement result of a intermediate logical qubit is −1.

15. The quantum computing system of claim 1, wherein a swap quantum complex operation command among the quantum complex operation commands is the quantum complex operation command for performing a swap of states of a first logical qubit and a second logical qubit with each other, and the first and second logical qubits are data logical qubits, and third and fourth logical qubits located on first and second boundaries of the first and second logical qubits are intermediate logical qubits.

16. The quantum computing system of claim 15, wherein the swap quantum complex operation command comprises:

a first initialization quantum basic operation command group for initializing the third and fourth logical qubits;

a first merge quantum basic operation command group for merging the first and third logical qubits located on the first boundary, and merging the second and fourth logical qubits;

a first split quantum basic operation command group for splitting the merged merge logical qubits into the first and third logical qubits in an entanglement state and into the second and fourth logical qubits;

a first movement post-processing quantum basic operation command group for moving the quantum states of the first and second logical qubits in the entanglement state to the third and fourth logical qubits, respectively, and changing the third and fourth logical qubits to data logical qubits corresponding to the first and second logical qubits, respectively;

a second initialization quantum basic operation command group for initializing the first and second logical qubits having been changed to intermediate logical qubits;

a second merge quantum basic operation command group for merging the first and fourth logical qubits located on the second boundary, and merging the second and third logical qubits;

a second split quantum basic operation command group for splitting the merged merge logical qubits into the first and fourth logical qubits in the entanglement state and into the second and third logical qubits; and a second movement post-processing quantum basic operation command group for moving the quantum states of the third and fourth logical qubits in the entanglement state to the second and first logical qubits, respectively, and changing the second and first logical qubits to data logical qubits corresponding to the third and fourth logical qubits, respectively.

17. The quantum computing system of claim 1, wherein the logical qubit quantum kernel executor comprises:

a logical qubit measurement result storage including a single logical qubit measurement result storage configured to generate and store a single logical qubit measurement result by combining measurement results of physical qubits, resulting from the physical quantum operation performed; and a quantum basic operation command post-processor configured to perform a quantum basic operation command for post-processing the logical qubit.

* * * * *